(12) United States Patent
Stenneth

(10) Patent No.: US 10,012,514 B2
(45) Date of Patent: Jul. 3, 2018

(54) DETERMINATION OF A SPATIAL AVOIDANCE LOCATION

(71) Applicant: HERE Global B.V., LB Veldhoven (NL)

(72) Inventor: Leon Oliver Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 151 days.

(21) Appl. No.: 14/708,166

(22) Filed: May 8, 2015

(65) Prior Publication Data

US 2016/0327401 A1   Nov. 10, 2016

(51) Int. Cl.
  *G01C 21/34* (2006.01)
  *G01C 21/00* (2006.01)

(52) U.S. Cl.
  CPC ....... *G01C 21/3461* (2013.01); *G01C 21/005* (2013.01); *G01C 21/3484* (2013.01)

(58) Field of Classification Search
  None
  See application file for complete search history.

(56) References Cited

U.S. PATENT DOCUMENTS

| | | | |
|---|---|---|---|
| 8,352,179 B2 | 1/2013 | French et al. | |
| 8,364,395 B2 | 1/2013 | French et al. | |
| 2008/0293430 A1* | 11/2008 | Blom | G01C 21/3484 455/456.1 |
| 2010/0027527 A1* | 2/2010 | Higgins | H04W 4/18 370/351 |
| 2013/0006521 A1 | 1/2013 | Needham et al. | |
| 2013/0024203 A1 | 1/2013 | Flores et al. | |
| 2014/0060150 A1 | 3/2014 | Shaw et al. | |
| 2014/0085181 A1 | 3/2014 | Roseway et al. | |
| 2014/0236472 A1 | 8/2014 | Rosario | |

OTHER PUBLICATIONS

Aksenov et al., "Tourist's Dynamic Needs and Affects in Personalised Travel Route Recommendations", Urban Planning Group, Eindhoven University of Technology, The Netherlands, 2014.

* cited by examiner

*Primary Examiner* — Mussa A Shaawat
*Assistant Examiner* — Kyung J Kim
(74) *Attorney, Agent, or Firm* — Lempia Summerfield Katz LLC

(57) ABSTRACT

A method includes receiving information indicative of a user input, from a user, that designates a subset of contacts from a contact list or social network friend's list as a spatial avoidance list, determining an intended user location, determining a set of spatial avoidance locations such that each spatial avoidance location of the set of spatial avoidance locations corresponds with a contact location of each contact of the spatial avoidance contact list, determining that the intended user location corresponds with at least one spatial avoidance location of the set of spatial avoidance locations, and determining a different intended user location based, at least in part, on the determination that the intended user location corresponds with at least one spatial avoidance location of the set of spatial avoidance locations, such that the different intended user location fails to correspond with any spatial avoidance location of the set of spatial avoidance locations.

20 Claims, 16 Drawing Sheets

FIG. 5A
FIG. 5B
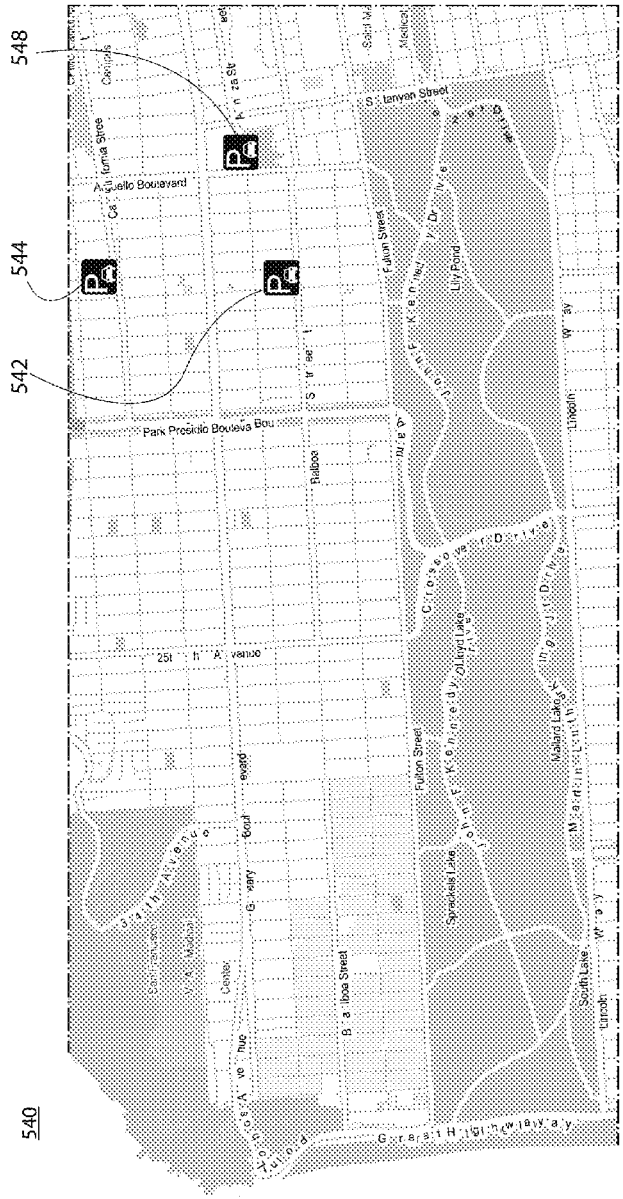
FIG. 5C

| Contact 702 | Location 712 |
|---|---|
| Contact 704 | Location 714 |
| Contact 706 | Location 716 |
| Contact 708 | Location 718 |

FIG. 7A

| Contact 722 | Location 732 | Schedule 742 |
|---|---|---|
| Contact 724 | Location 734 | Schedule 744 |
| Contact 726 | Location 736 | Schedule 746 |
| Contact 728 | Location 738 | Schedule 748 |

FIG. 7B

| | | |
|---|---|---|
| 802 | John Smith | ☐ |
| 804 | Jane Doe | ☐ |
| 806 | Mary Roe | ☑ |
| 808 | Mother | ☐ |

| | | |
|---|---|---|
| 812 | John Smith | 8:00am-5:00pm |
| 814 | Jane Doe | 12:00pm-3:00pm |
| 816 | Mary Roe | 5:00pm-10:00am |
| 818 | Mother | do not avoid |

DETERMINATION OF A SPATIAL AVOIDANCE LOCATION

TECHNICAL FIELD

The present application relates generally to determination of a spatial avoidance location.

BACKGROUND

As electronic apparatuses become increasingly prevalent and pervasive in our society, people increasingly utilize electronic apparatuses to identify locations. Many users may utilize electronic apparatuses for purposes relating to identifying particular locations. As such, it may be desirable to configure an electronic apparatus such that the electronic apparatus facilitates identifying locations in an intuitive and simple manner.

SUMMARY

Various aspects of example embodiments are set out in the summary, the drawings, the detailed description, and the claims.

One or more example embodiments may provide an apparatus, a computer readable medium, a non-transitory computer readable medium, a computer program product, and/or a method for receiving information indicative of a user input, from a user, that designates a subset of contacts from a contact list as a spatial avoidance contact list, determining an intended user location, determining a set of spatial avoidance locations such that each spatial avoidance location of the set of spatial avoidance locations corresponds with a contact location of each contact of the spatial avoidance contact list, determining that the intended user location corresponds with at least one spatial avoidance location of the set of spatial avoidance locations, and determining a different intended user location based, at least in part, on the determination that the intended user location corresponds with at least one spatial avoidance location of the set of spatial avoidance locations, such that the different intended user location fails to correspond with any spatial avoidance location of the set of spatial avoidance locations.

One or more example embodiments may provide an apparatus, a computer readable medium, a computer program product, and/or a non-transitory computer readable medium having means for receiving information indicative of a user input, from a user, that designates a subset of contacts from a contact list as a spatial avoidance contact list, means for determining an intended user location, means for determining a set of spatial avoidance locations such that each spatial avoidance location of the set of spatial avoidance locations corresponds with a contact location of each contact of the spatial avoidance contact list, means for determining that the intended user location corresponds with at least one spatial avoidance location of the set of spatial avoidance locations, and means for determining a different intended user location based, at least in part, on the determination that the intended user location corresponds with at least one spatial avoidance location of the set of spatial avoidance locations, such that the different intended user location fails to correspond with any spatial avoidance location of the set of spatial avoidance locations.

One or more example embodiments further perform causation of display of a spatial avoidance indicator that identifies the intended user location as a spatial avoidance location based, at least in part, on the determination that the intended user location corresponds with at least one spatial avoidance location of the set of spatial avoidance locations.

In at least one example embodiment, the spatial avoidance indicator comprises information indicative of a contact that has a contact location that corresponds with the intended user location.

One or more example embodiments further perform determination of a set of spatial avoidance regions such that each spatial avoidance region of the set of spatial avoidance regions is a region around the spatial avoidance location of each contact of the spatial avoidance contact list.

In at least one example embodiment, the region around the spatial avoidance location is bounded by an avoidance distance.

One or more example embodiments further perform receipt of information indicative of a user input that designates the avoidance distance.

In at least one example embodiment, the region around the spatial avoidance location is bounded by at least one object.

In at least one example embodiment, the object is a point of interest represented in a geographic database.

In at least one example embodiment, the object is a structure represented in a geographic database.

One or more example embodiments further perform determination of a set of contact proximity notification regions such that each contact proximity notification region of the set of contact proximity notification regions is a region around a current contact location of each contact of the spatial avoidance contact list, determination that a current user location corresponds with at least one contact proximity notification region of the set of contact proximity notification regions, and causation of rendering of a contact proximity notification based, at least in part, on the determination that the current user location corresponds with at least one contact proximity notification region of the set of contact proximity notification regions.

In at least one example embodiment, the contact proximity notification comprises information indicative of a contact that has a contact proximity region that corresponds with the current user location.

In at least one example embodiment, the region around the spatial avoidance location is bounded by a contact proximity notification distance.

One or more example embodiments further perform receipt of information indicative of a user input that designates the contact proximity notification distance.

In at least one example embodiment, the region around the spatial avoidance location is bounded by at least one object.

In at least one example embodiment, the object is a structure represented in a geographic database.

One or more example embodiments further perform determination of a spatial avoidance schedule that indicates at least one time period for utilization of the spatial avoidance contact list.

One or more example embodiments further perform determination of an intended user location time that is a time at which the user is intended to be at the intended user location, and determination that the intended user location time is within the spatial avoidance schedule.

In at least one example embodiment, the determination that the intended user location corresponds with at least one spatial avoidance location of the set of spatial avoidance locations is based, at least in part, on the determination that the intended user location time is within the spatial avoidance schedule.

One or more example embodiments further perform determination that a current time is within the spatial avoidance schedule.

In at least one example embodiment, the determination that the intended user location corresponds with at least one spatial avoidance location of the set of spatial avoidance locations is based, at least in part, on the determination that the current time is within the spatial avoidance schedule.

One or more example embodiments further perform receipt of information indicative of a user input that designates the spatial avoidance schedule.

In at least one example embodiment, the determination of the set of spatial avoidance locations fails to evaluate any location of at least one contact of the contact list that is absent from the spatial avoidance contact list.

In at least one example embodiment, the determination that the intended user location corresponds with at least one spatial avoidance location of the set of spatial avoidance locations fails to consider any location of at least one contact of the contact list that is absent from the spatial avoidance contact list.

In at least one example embodiment, the intended user location differs from a current location of the user.

One or more example embodiments further perform causation of display of a spatial avoidance contact indicator that identifies a spatial avoidance location of a spatial avoidance contact of the spatial avoidance contact list.

In at least one example embodiment, the spatial avoidance contact indicator comprises information indicative of the spatial avoidance contact.

One or more example embodiments further perform determination that a contact location of at least one contact of the spatial avoidance contact list has changed, and update of the set of spatial avoidance locations based, at least in part, on the determination that the contact location of at least one contact of the spatial avoidance contact list has changed.

In at least one example embodiment, the contact list comprises at least one of a social media contact, a phone book contact, or a transitive contact.

In at least one example embodiment, the determination of the set of spatial avoidance locations is determined absent consideration of an odor of the user.

One or more example embodiments further perform determination of a navigational route.

In at least one example embodiment, determination of the intended user location comprises identification of a location along the navigational route as the intended user location.

In at least one example embodiment, the determination of the different intended user location comprises determination of a different navigational route that excludes any spatial avoidance location of the set of spatial avoidance locations.

In at least one example embodiment, the determination of the different intended user location comprises determination of a different navigational route that excludes the intended user location.

In at least one example embodiment, the intended user location is a destination location.

In at least one example embodiment, the destination location is a recommended destination location, and the different intended user location is a different recommended destination location.

BRIEF DESCRIPTION OF THE DRAWINGS

For a more complete understanding of one or more example embodiments, reference is now made to the following descriptions taken in connection with the accompanying drawings in which:

FIGS. 5A-5D are diagrams illustrating spatial avoidance indicators according to at least one example embodiment;

FIGS. 7A-7B are diagrams illustrating association of a contact with a location according to at least one example embodiment;

DETAILED DESCRIPTION OF THE DRAWINGS

Figure 1:
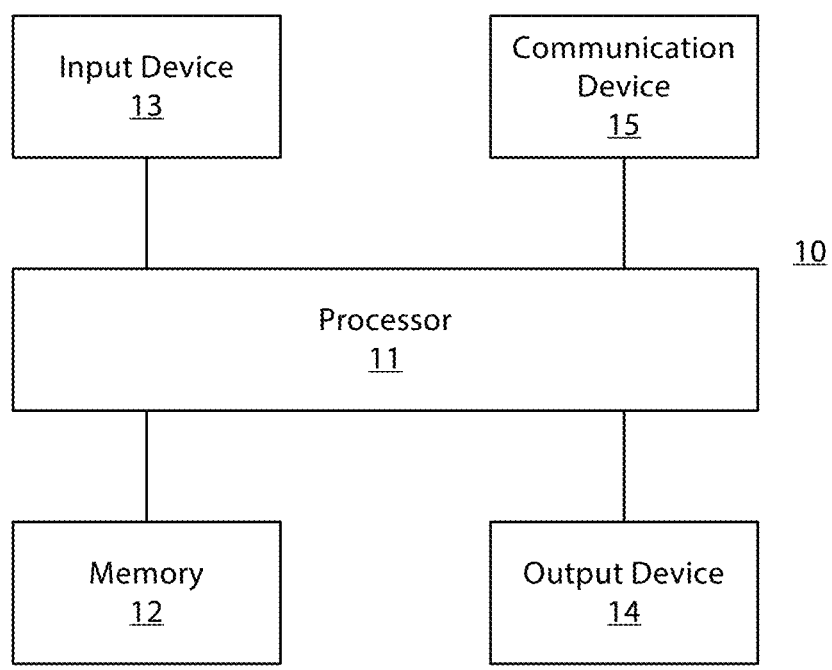
FIG. 1 is a block diagram showing an apparatus according to at least one example embodiment.

Various example embodiments and some of their potential advantages are understood by referring to FIGS. 1 through 14 of the drawings.

Some example embodiments will now further be described hereinafter with reference to the accompanying drawings, in which some, but not all, example embodiments are shown. One or more example embodiments may be embodied in many different forms and the claims should not be construed as being strictly limited to the example embodiments set forth herein; rather, these example embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with one or more example embodiments. Thus, use of any such terms should not be taken to limit the spirit and scope of example embodiments.

Additionally, as used herein, the term 'circuitry' refers to (a) hardware-only circuit implementations (e.g., implementations in analog circuitry, digital circuitry and/or any combination thereof); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that utilize software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit, an applications processor integrated circuit, a cellular network apparatus, other network apparatus, and/or other computing apparatus.

As defined herein, a "non-transitory computer readable medium," which refers to a physical medium (e.g., volatile or non-volatile memory device), can be differentiated from a "transitory computer-readable medium," which refers to an electromagnetic signal. In at least one example embodiment, a non-transitory computer readable medium is a tangible non-transitory computer readable medium.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from one or more example embodiments and, therefore, should not be taken to limit the scope of the claims. While electronic apparatus 10 is illustrated and will be hereinafter described for purposes of example, other types of electronic apparatuses may readily employ one or more example embodiments. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, an automobile, a kiosk, an electronic table, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ one or more example embodiments regardless of any intent to provide mobility. In this regard, even though some example embodiments may be described in conjunction with mobile applications, it should be understood that such example embodiments may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises at least one processor, such as processor 11 and at least one memory, such as memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types (e.g., one or more standards in the Institute of Electrical and Electronics Engineers (IEEE) 802 family of wired and wireless standards). By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing one or more example embodiments including, for example, one or more of the functions described herein. For example, processor 11 may comprise means, such as a digital signal processor device, a microprocessor device, an analog to digital converter, a digital to analog converter, processing circuitry and other circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus, and/or the like. For example, the apparatus may send the information to a separate display, to a computer, to a laptop, to a mobile apparatus, and/or the like. For example, the apparatus may be a server that causes display of the information by way of sending the information to a client apparatus that displays the information. In this manner, causation of display of the information may comprise sending one or more messages to the separate apparatus that comprise the information, streaming the information to the separate apparatus, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition, or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In example embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display, or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element that is separate from processor 11 for processing data, such as image data. The camera module may provide data, such as image data, in one or more of various formats. In at least one example embodiment, the camera module comprises an encoder, a decoder, and/or the like for compressing and/or decompressing image data. The encoder and/or decoder may encode and/or decode according to a standard format, for example, a Joint Photographic Experts Group (JPEG) standard format.

One or more example embodiments may include a geographic database. For example, the geographic database may include node data records, road segment or link data records, point of interest (POI) data records, and other data records. More, fewer or different data records may be provided. In at least one example embodiment, the other data records include cartographic ("carto") data records, routing data, and maneuver data. One or more portions, components, areas, layers, features, text, and/or symbols of the POI or event data may be stored in, linked to, and/or associated with one or more of these data records. For example, one or more portions of the POI, event data, or recorded route information may be matched with respective map or geographic records via position or GPS data associations (such as using known or future map matching or geo-coding techniques), for example.

In at least one example embodiment, the road segment data records are links or segments representing roads, streets, or paths, as may be used in the calculated route or recorded route information for determination of one or more personalized routes. The node data records may be end points corresponding to the respective links or segments of the road segment data records. The road link data records and the node data records may represent a road network, such as used by vehicles, cars, and/or other entities. Alternatively, the geographic database may contain path segment and node data records or other data that represent pedestrian paths or areas in addition to or instead of the vehicle road record data, for example.

The road/link segments and nodes may be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database may include data about the POIs and their respective locations in the POI data records. The geographic database may also include data about places, such as cities, towns, or other communities, and other geographic features, such as bodies of water, mountain ranges, etc. Such place or feature data may be part of the POI data or may be associated with POIs or POI data records (such as a data point used for displaying or representing a position of a city). In addition, the geographic database may include and/or be associated with event data (e.g., traffic incidents, constructions, scheduled events, unscheduled events, etc.) associated with the POI data records or other records of the geographic database.

The geographic database may be maintained by a content provider (e.g., a map developer) in association with a services platform. By way of example, the map developer may collect geographic data to generate and enhance the geographic database. There may be different ways used by the map developer to collect data. These ways may include obtaining data from other sources, such as municipalities or respective geographic authorities. In addition, the map developer may employ field personnel to travel by vehicle along roads throughout the geographic region to observe features and/or record information about them, for example. Also, remote sensing, such as aerial or satellite photography, may be used.

The geographic database may be a master geographic database stored in a format that facilitates updating, maintenance, and development. For example, the master geographic database or data in the master geographic database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

Geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by an end user device, for example. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

As mentioned above, a server side geographic database may be a master geographic database, but in alternate embodiments, a client side geographic database may represent a compiled navigation database that may be used in or with end user devices to provide navigation and/or map-related functions. For example, the geographic database may be used with an end user device to provide an end user with navigation features. In such an example, the geographic database may be downloaded or stored on the end user device, such as in one or more applications, or the end user device may access the geographic database through a wireless or wired connection (such as via a server and/or a communication network), for example.

In at least one example embodiment, the end user device is one of an in-vehicle navigation system, a personal navigation device (PND), a portable navigation device, a cellular telephone, a mobile phone, a personal digital assistant (PDA), a watch, a camera, a computer, and/or other device that may perform navigation-related functions, such as digital routing and map display. In at least one example embodiment, the navigation device is a cellular telephone. An end user may use the end user device for navigation and map functions such as guidance and map display, for example, and for determination of one or more personalized routes or route segments based on one or more calculated and recorded routes, according to exemplary embodiments.

Figure 2:
FIG. 2 is a diagram illustrating user locations according to at least one example embodiment.

FIG. 2 is a diagram illustrating user locations according to at least one example embodiment. The example of FIG. 2 is merely an example and does not limit the scope of the claims. For example, the number of locations may vary, the type of locations may vary, the representation of the locations may vary, and/or the like.

In many circumstances, a user may interact with one or more apparatuses, programs, and/or the like. For example, the user may regularly interact with a mobile telephone, an interactive mapping program, a navigation program, and/or the like. Programs and/or apparatuses such as these may provide particular features and/or functionality to a user of the program and/or the apparatus. For example, an interactive mapping program may offer navigation features, routing information, mapping information, recommendations, notifications, advertising, and/or the like. Such features may be referred to as map functions. For example, the user may utilize an interactive mapping program on a mobile device, such as a cellular telephone, a tablet computer, and/or the like, to identify navigational routes, points of interest, and/or the like. Programs such as these may cause display of visual information based, at least in part, on map functions, user inputs, stored data, retrieved data, and/or the like.

The example of FIG. 2 illustrates visual information representation 200. Visual information representation 200 may be representative of information received, generated, displayed, and/or the like from a program, such as an interactive mapping program, a navigation program, and/or the like. In the example of FIG. 2, visual information representation 200 comprises visual representations of various roads, as well as visual indicators 202, 204, and 206. In the example of FIG. 2, visual indicator 202 is representative of a navigational route between the locations represented by visual indicators 204 and 206. For example, visual indicator 204 may be representative of a user's present location, a determined present location of the user, a present location of the user's apparatus, a start point associated with the navigational route and/or the like, and visual indicator 206 may be representative of an intended location of the user, a point of interest of the user, a navigational waypoint of the route represented by visual indicator 202, and/or the like. In this manner, a user may view visual information representation 200 and determine that a navigational route corresponding with visual indicator 202 exists between the locations represented by visual indicators 204 and 206.

As previously described, an apparatus and/or a program, such as an interactive mapping program, may offer map functions. For example, an apparatus running an interactive mapping program may determine an intended user location, a navigational route, and/or the like. For example, an apparatus running an interactive mapping program may receive information indicative of one or more intended user locations, destination addresses, points of interest, navigational waypoints, and/or the like from a user of the interactive mapping program. The apparatus may utilize this information to determine a navigational route comprising the destination addresses, waypoints, and/or the like that were received. An intended user location may refer to a location a user may desire to travel to in the near future, a location that the user is currently traveling to, and/or the like. For example, the user may desire to travel to a point of interest that is at a location that differs from the user's current location. The point of interest, various points along a navigational route between the user's current location and the location of the point of interest, and/or the like may be intended user locations. In at least one example embodiment, an intended user location is determined. For example, an apparatus may determine a user's intended location from a user input. For instance, a user may enter a voice input, a touch input, and/or the like indicating a user desire to travel to a point of interest such as a restaurant, a parking lot, a particular seat in a theater, and/or the like. In at least one example embodiment, a navigational route is determined. For example, an apparatus running interactive mapping program may receive information indicative of the location represented by visual indicator 206 of FIG. 2 along with a request from a user to determine a navigational route. The apparatus may determine that the location represented by visual indicator 206 is an intended user location, the location represented by visual indicator 204 of FIG. 2 is the user's current location, and determine the navigational route represented by visual indicator 202 of FIG. 2. In this manner, the intended user location may be a location along the navigational route. In at least one example embodiment, determination of an intended user location comprises identification of a location along a navigational route as the intended user location. For example, an apparatus may determine that a particular address, a particular point of interest, and/or the like along a navigational route may be an intended user location. In at least one example embodiment, an intended user location differs from a current location of the user. For example, a user may currently be located at their home, and the intended user location may be the user's office. In at least one example embodiment, an intended user location is a destination location. A destination location may refer to the location of location a terminal destination of a navigational route, a location of a point of interest, a location a user wishes to travel to, and/or the like. For example, a destination location may be a restaurant, fuel refilling station, a rest stop, a parking lot, a parking space within a parking lot, a seat within a venue such as a theater, a seat within a vehicle such as an airplane, a particular vehicle such as a particular train car or a particular vehicle for hire (e.g. a taxicab), and/or the like.

Figure 3A:
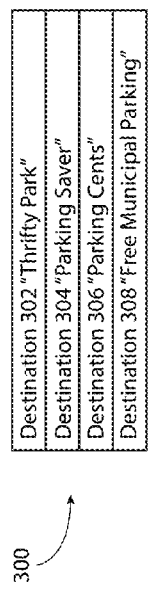
FIGS. 3A-3B are diagrams illustrating user locations according to at least one example embodiment.
Figure 3B:
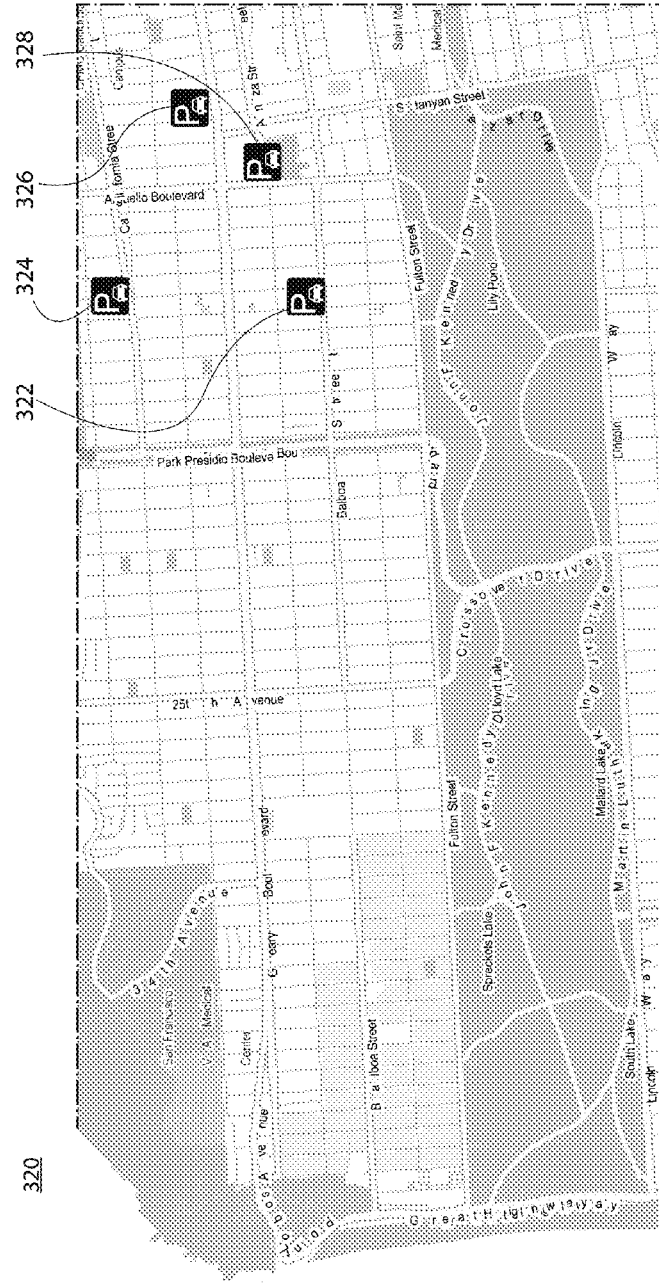

FIGS. 3A-3B are diagrams illustrating user locations according to at least one example embodiment. The examples of FIGS. 3A-3B are merely examples and do not limit the scope of the claims. For example, the number of locations may vary, the type of locations may vary, the representation of the locations may vary, and/or the like.

In some circumstances, a user may be traveling to a location, such as a restaurant, a theater, and/or the like. In circumstances such as these, a user may desire to receive information related to the location, such as a nearby parking spot, a particular seat in the theater, and/or the like. For instance, the user may be unfamiliar with the area, the user may not know what seats are unreserved in the theater, and/or the like. In circumstances such as these, a user may desire to receive one more recommended destination locations. A recommended destination location may refer to a destination location recommended to a user based on some criteria, such as a corresponding route, a nearby address, affiliation with a business chain, and/or the like. For example, an apparatus may receive information indicative of a destination address and a user request for points of interest near the destination address. For example, the destination address may be a restaurant the user wishes to dine at, and the points of interest may be parking lots near the restaurant. In such an example, the destination address and the parking lots may be intended user locations, similar as previously described. In circumstance where a user desires to receive one more recommended destination locations, it may be desirable for an apparatus, a program, and/or the like to cause display of visual indicators of one or more recommended destination locations. In this manner, the user may select a particular recommended destination location as an intended user location, compare various aspects of the recommended destination locations, and/or the like. In at least one example embodiment, a destination location is a recommended destination location.

The example of FIG. 3A illustrates visual information representation 300. Visual information representation 300 may be representative of information received, generated, displayed, and/or the like from a program, such as an interactive mapping program, a navigation program, and/or the like. In the example of FIG. 3A, visual information representation 300 comprises visual indicators destinations comprising destinations 302, 304, 306, and 308. For example, it can be seen that destination 302 corresponds with a location known as "Thrifty Park." In the example of FIG. 3A, destinations 302, 304, 306, and 308 may be representative of recommended destination locations. For instance, an apparatus may have received information indicative of a user request for parking locations near a particular destination address. In response, the apparatus may have caused display of visual information representation 300, and destinations 302, 304, 306, and 308 may be representative of parking lots near the destination address returned by an interactive mapping program. In this manner, a user may view visual information representation 300 and determine that parking lots are located at locations corresponding with destinations 302, 304, 306, and 308.

Similarly, the example of FIG. 3B illustrates visual information representation 320. Visual information representation 320 may be representative of information received, generated, displayed, and/or the like from a program, such as an interactive mapping program, a navigation program, and/or the like. In the example of FIG. 3B, visual information representation 320 comprises visual representations of various roads, as well as visual indicators 322, 324, 326, and 328. In the example of FIG. 3B, visual indicators 322, 324, 326, and 328 may be representative of destination locations. For example, it can be seen that visual indicator 322 is rendered at a particular position in relation to the other visual representations and indicators of visual information representation 320. This manner, visual indicator 322 may be representative of a particular location, and a user may determine the location by viewing visual information representation 320. In the example of FIG. 3B, visual indicators 322, 324, 326, and 328 may be representative of recommended destination locations. For instance, an apparatus may have received information indicative of a user request for parking locations near a particular destination address. In response, the apparatus may have caused display of visual information representation 320, and visual indicators 322, 324, 326, and 328 may be representative of parking lots near the destination address returned by an interactive mapping program. In this manner, a user may view visual information representation 320 and determine that parking lots are located at locations corresponding with visual indicators 322, 324, 326, and 328.

Figure 4A:
FIGS. 4A-4B are diagrams illustrating spatial avoidance indicators according to at least one example embodiment.
Figure 4B:
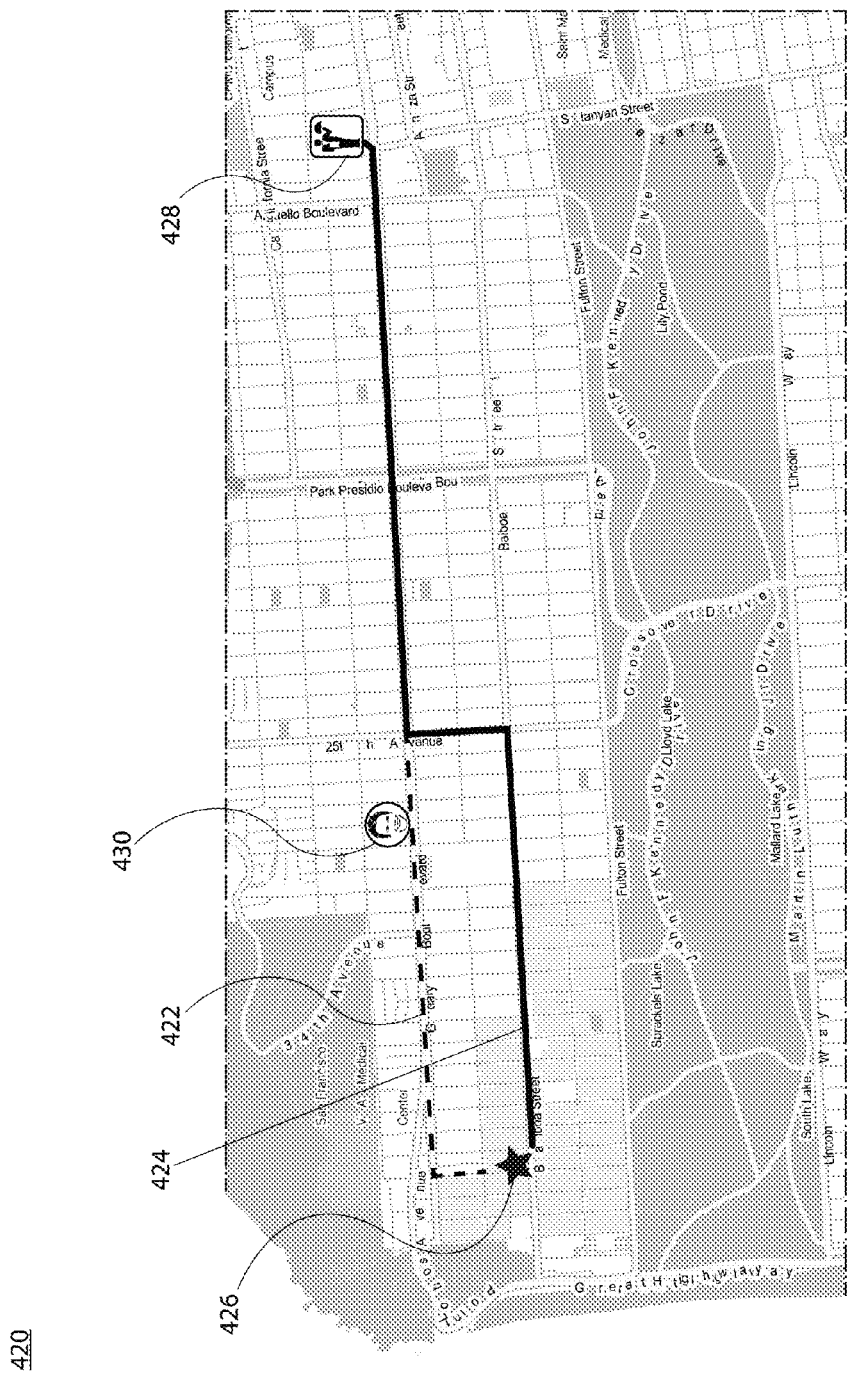

FIGS. 4A-4B are diagrams illustrating spatial avoidance indicators according to at least one example embodiment. The examples of FIGS. 4A-4B are merely examples and do not limit the scope of the claims. For example, the type of spatial avoidance indicators may vary, the appearance of the spatial avoidance indicators may vary, the number of spatial avoidance indicators may vary, and/or the like.

In some circumstances, a user of an apparatus may wish to avoid a contact. A contact may refer to a person the user is acquainted with. For example, a user of an apparatus may be feeling ill, may be in a poor mood, and/or the like. In such circumstances, the user may be concerned with infecting a contact with a pathogen that is causing their illness, allowing their poor mood to cause a negative social interaction with a contact, and/or the like. In circumstances such as these, it may be desirable for the user to utilize the apparatus to spatially avoid the contact. For example, the user may not know the locations of the contacts the user wishes to avoid, and the apparatus may provide the user information such that the user may spatially avoid the contacts. Spatial avoidance may refer to maintaining a distance between a contact and a user such that the contact is unable to interact with the user, see the user, be infected by the user, and/or the like. By spatially avoiding the contact, the user may avoid spreading their illness to the contact, having a negative social interaction with the contact, and/or the like.

An apparatus, a user, a program, and/or the like may determine, identify, store, access, and/or the like contacts by way of a contact list, a database, a service provider, a server, and/or the like. For example, a user may have a list of contacts on a mobile telephone, a list of contacts on a social networking site, and/or the like. In another example, a database may store a list of persons a typical user may wish to avoid (e.g. a list of convicted felons), and the apparatus may determine that persons on the list are spatial avoidance contacts, similar as described below. In such an example, the apparatus may identify persons from the database that satisfy a particular criteria, such as persons who are convicted felons, or persons who have been convicted or particular types of crimes, such as violent crimes or sex-related crimes. A contact list may be similar as described regarding FIGS. 8A-8C. In circumstances, where a user wishes to spatially avoid a contact, the user may designate a subset of contacts that comprise a contact list. For example, a user may designate a subset of contacts from a contact list as a spatial avoidance contact list similar as described regarding FIGS. 8A-8C. In at least one example embodiment, information indicative of a user input is received from a user. In such an example embodiment, the user input is an input that designates a subset of contacts from a contact list as a spatial avoidance contact list. A contact on a spatial avoidance contact list may be referred to as a spatial avoidance contact.

In circumstances where a user wishes to spatially avoid a contact, it may be desirable to determine one or more spatial avoidance locations. A spatial avoidance location may refer to a location where a user is likely to encounter a contact the user wishes to spatially avoid such that the contact may be able to interact with the user, see the user, be infected by the user, and/or the like. For example, a contact may be at a particular location (e.g. his place of employment), the user may be at a particular place at a particular time (e.g. at his place of employment during normal business hours), the contact may be at current location that may be determined, the last known location of a contact may be determined, and/or the like. A location such as any one of these may be referred to as a contact location. In these circumstances, a contact location may be a spatial avoidance location. An apparatus, a program, and/or the like may determine a contact location in various manners. For example, in some circumstances, an apparatus may have access to real time location data of a contact. For example, the contact may carry a mobile telephone that reports the location of the mobile telephone to a server, and the apparatus may have access to the reported location on the server. In other instances, the user may report their location on a social media network (e.g. "checking in" on Facebook), and the apparatus may retrieve the reported location from the social media network. In at least one example embodiment, a set of spatial avoidance locations is determined such that each spatial avoidance location of the set of spatial avoidance locations corresponds with a contact location of each contact of a spatial avoidance contact list. The correspondence may be similar as described regarding FIGS. 7A-7B.

As previously described, in some circumstances a user may wish to spatially avoid contacts. For instance in some circumstances, a user may wish to spatially avoid a contact based on an odor of the user. For example, the user may be concerned that the user's odor may offend a contact. In some circumstances, a user may wish to spatially avoid a contact for other purposes. For example, the user may wish to avoid a negative social interaction with a contact, similarly as previously described. In at least one example embodiment, determination of a set of spatial avoidance locations is determined absent consideration of an odor of the user.

As previously described, a program, an apparatus, and/or the like may determine a navigational route that comprises an intended location, such as a starting location of a route, a destination location at the end of a route, any location along a route, and/or the like. In some circumstances, an intended location may comprise a spatial avoidance location, may correspond with a spatial avoidance location, and/or the like. For example, a navigational route may include the area surrounding the current location of a contact a user wishes to spatially avoid. In circumstances such as these, it may be desirable to determine a different intended user location based, at least in part, on a determination that the intended user location corresponds with a spatial avoidance location. In this manner, a different navigational route may be determined that excludes the spatial avoidance location. In at least one example embodiment, a different intended user location is determined based, at least in part, on a determination that an intended user location corresponds with at least one spatial avoidance location, such that the different intended user location fails to correspond with the spatial avoidance location. A location, such as an intended user location may correspond with another location, such as a spatial avoidance location in a number of manners. For example, two locations may correspond if the locations have identical geographical coordinates (e.g. latitude and longitude), are within a threshold range, and/or the like. A threshold range may refer to a radius around a location in which the location may correspond with a different location. For instance, an intended user location may correspond with a spatial avoidance location if geographical coordinates associated with the spatial avoidance location indicate that the spatial avoidance location is within a radius (e.g. 5 meters, 25, meters, and/or the like) of a location indicated by geographical coordinates associated with the intended user location. For example, a user may specify a particular threshold range (e.g. 5 meters, 25, meters, 100 meters, and/or the like). In this manner, a location may correspond with another location if the locations are within proximity to each other.

In some circumstances, a location may correspond with a different location by way of a route. For example, a route of a user may overlap with a route of a spatial avoidance contact. In circumstances such as these, a location where the route of the overlaps the location of the route of the spatial avoidance contact may be said to correspond. For example, the geographic coordinates where location of the routes overlap, a radius around the location of the routes overlap, and/or the like may be described as an intended user location that corresponds with a spatial avoidance location. In at least one example embodiment, determination of the different intended user location comprises determination of a different navigational route that excludes the spatial avoidance location. For instance, a program, an apparatus, and/or the like may determine that the navigational route represented by visual indicator 202 of FIG. 2 comprises an intended user location that corresponds with a spatial avoidance location. The apparatus, the apparatus, and/or the like may determine a different route that excludes the spatial avoidance location.

The example of FIG. 4A illustrates visual information representation 400. Visual information representation 400 may be representative of information received, generated, displayed, and/or the like from a program, such as an interactive mapping program, a navigation program, and/or the like. In the example of FIG. 4A, visual information representation 400 comprises visual representations of various roads, as well as visual indicators 402, 404, 406, and 408. In the example of FIG. 4A, visual indicator 402 is representative of a portion of a navigational route between the locations represented by visual indicators 406 and 408. For example, visual indicator 406 may be representative of a location of a user's present location, a determined present location of the user, and/or the like, and visual indicator 408 may be representative of an intended location of the user, a point of interest of the user, a navigational waypoint the route represented by visual indicator 402, and/or the like. In this manner, a user may view visual information representation 400 and determine that a portion of a navigational route corresponding with visual indicator 402 exists between the locations represented by visual indicators 406 and 408. In the example of FIG. 4A, visual indicator 404 is representative of a navigational route between the locations represented by visual indicators 406 and 408. In this manner, a user may view visual information representation 400 and determine that a navigational route corresponding with visual indicator 404 exists between the locations represented by visual indicators 406 and 408.

As previously described, in circumstances where a navigational route includes a spatial avoidance location, a program, an apparatus, and/or the like may determine a different route that excludes the spatial avoidance location. For example, an apparatus may determine that the navigational route represented by visual indicator 202 of FIG. 2 comprises an intended user location that corresponds with a spatial avoidance location. In such an example, the apparatus may determine a different route, such as the navigational route represented by visual indicator 404 of FIG. 4A that excludes the spatial avoidance location. For instance, a portion of the navigational route represented by visual indicator 402 of FIG. 4A may correspond with a spatial avoidance location, an intended user location, and/or the like of the navigational route represented by visual indicator 202 of FIG. 2. The apparatus may determine the different navigational route to be the navigational route represented by visual indicator 404 of FIG. 4A and cause display of visual information representation 400. In this manner, the different navigational route excludes the spatial avoidance location that corresponds with the navigational route represented by visual indicator 402, excludes the intended user location represented by visual indicator 402, and the determination of the different navigational route includes determination of a different intended user location. In at least one example embodiment, determination of a different intended user location comprises determination of a different navigational route that excludes the intended user location.

As previously described, in some circumstances, a user of an apparatus, a program, and/or the like may wish to spatially avoid a contact. In circumstances such as these, it may be desirable for an apparatus, a program, and/or the like to cause display of a spatial avoidance indicator. A spatial avoidance indicator may refer to a visual indicator that identifies a location as a spatial avoidance location. For example, a user may view a spatial avoidance indicator and determine that a location associated with a spatial avoidance indicator is a spatial avoidance location. In this manner, the user may avoid traveling to the location associated with the spatial avoidance indicator.

For instance, in the example of FIG. 4A, it can be seen that visual indicator 402 has been rendered with a different appearance than visual indicator 404. In this manner, visual indicator 402 may be a spatial avoidance indicator. For example, one or more locations corresponding with the navigational route represented by visual indicator 402 may be spatial avoidance locations. A user may recognize that visual indicator 402 is a spatial avoidance indicator, and may avoid traveling on the navigational route represented by visual indicator 402. Even though visual indicator 402 is illustrated as having a particular appearance, it should be understood that a spatial avoidance indicator may have any appearance. In at least one example embodiment, display is caused of a spatial avoidance indicator that identifies an intended user location as a spatial avoidance location. In at least one example embodiment, causation of display of a spatial avoidance indicator is based, at least in part, on a determination that an intended user location corresponds with a spatial avoidance location.

In some circumstances, it may be desirable for a spatial avoidance indicator to comprise information indicative of a contact. For example, an apparatus, a program, and/or the like may display a plurality of spatial avoidance indicators. In circumstances such as these, a user may wish to determine which contact is associated with which spatial avoidance indicator. For example, it may not be feasible to spatially avoid every contact, and the user may wish to prioritize spatially avoiding a particular contact over another contact. In at least one example embodiment, a spatial avoidance indicator comprises information indicative of a contact that has a contact location that corresponds with an intended user location.

The example of FIG. 4B illustrates visual information representation 420. Visual information representation 420 may be representative of information received, generated, displayed, and/or the like from a program, such as an interactive mapping program, a navigation program, and/or the like. In the example of FIG. 4B, visual information representation 420 comprises visual representations of various roads, as well as visual indicators 422, 424, 426, 428 and 430. In the example of FIG. 4B, visual indicator 422 is representative of a portion of a navigational route between the locations represented by visual indicators 426 and 428. For example, visual indicator 426 may be representative of a user's present location, a determined present location of the user, and/or the like, and visual indicator 428 may be representative of an intended location of the user, a point of interest of the user, a navigational waypoint of a navigational route represented by visual indicator 422, and/or the like. In this manner, a user may view visual information representation 420 and determine that a portion of a navigational route corresponding with visual indicator 422 exists between the locations represented by visual indicators 426 and 428. In the example of FIG. 4B, visual indicator 424 is representative of a navigational route between the locations represented by visual indicators 426 and 428. In this manner, a user may view visual information representation 420 and determine that a navigational route corresponding with visual indicator 424 exists between the locations represented by visual indicators 406 and 408.

In the example of FIG. 4B, it can be seen that visual indicator 422 has been rendered with a different appearance than visual indicator 424. In this manner, visual indicator 422 may be a spatial avoidance indicator. For example, one or more locations corresponding with the navigational route represented by visual indicator 422 may be spatial avoidance locations. A user may recognize that visual indicator 422 is a spatial avoidance indicator, and may avoid traveling on the navigational route represented by visual indicator 422. Even though visual indicator 422 is illustrated as having a particular appearance, it should be understood that a spatial avoidance indicator may have any appearance.

In the example of FIG. 4B, visual indicator 430 is representative of a contact location of a contact. It can be seen that visual indicator 430 comprises an image of a face of a contact. In this manner, visual indicator 430 may comprise information indicative of the contact corresponding with the contact location represented by visual indicator 430. For example, the image may be an image of the contact. In circumstances where the location represents a spatial avoidance location, visual indicator 430 may be a spatial avoidance indicator. For example, a user may avoid traveling to the location represented by visual indicator 430 during circumstances where the user wishes to spatially avoid the contact represented by visual indicator 430.

In the example of FIG. 4B, it can be seen that visual indicator 430 is rendered at a position near visual indicator 424. As previously described, visual indicator 424 may be a spatial avoidance indicator, and visual indicator 430 may be a spatial avoidance indictor. In this example, visual indicator 424 and visual indicator 430 may comprise a spatial avoidance indicator corresponding with one or more contact locations represented by visual indicators 424 and 430 that is indicative of the contact represented by visual indicator 430.

FIGS. 5A-5D are diagrams illustrating spatial avoidance indicators according to at least one example embodiment. The examples of FIGS. 5A-5D are merely examples and do not limit the scope of the claims. For example, the type of spatial avoidance indicators may vary, the appearance of the spatial avoidance indicators may vary, the number of spatial avoidance indicators may vary, and/or the like.

As previously described, in some circumstances an apparatus, a program, and/or the like may cause display of visual information representations of one or more recommended destination locations. In some circumstances, it may be desirable to preclude display of visual indicators of one or more recommended destination locations. For example, a recommended destination location may correspond with a spatial avoidance location. In circumstances such as these, causing display of a list of recommended destination locations that precludes display of a recommended destination location that corresponds with a spatial avoidance location may persuade a user to travel to a recommended location other than the spatial avoidance location. For example, the user may choose to travel to a recommended destination that is displayed on the list. In this manner, the user may avoid a contact associated with the spatial avoidance location.

The example of FIG. 5A illustrates visual information representation 500. Visual information representation information 500 may be representative of information received, generated, displayed, and/or the like from a program, such as an interactive mapping program, a navigation program, and/or the like. In the example of FIG. 5A, visual information representation 500 comprises a visual representation of a list of destinations comprising destinations 502, 504, and 508. In the example of FIG. 5A, destinations 502, 504, and 508 may be representative of recommended destination locations. For example, destinations 502, 504, and 508 may be representative of parking lots near a destination address of a user of an interactive mapping program. In this manner, a user may view visual information representation 500 and determine that parking lots are located at locations corresponding with destinations 502, 504, and 508.

It can be seen that the example of FIG. 5A is similar in appearance to the example of FIG. 3A. For example, FIGS. 3A and 5A both include destinations corresponding with "Thrifty Park," "Parking Saver," and "Free Municipal parking." In this manner, destinations 302, 304, and 308 of FIG. 3A may correspond with the same locations represented by destinations 502, 504, and 508 of FIG. 5A. It can be seen that the example of FIG. 5A fails to include a destination corresponding with destination 306 ("Parking Cents") of FIG. 3A. In an example where "Parking Cents" is a spatial avoidance location, a program, an apparatus, and/or the like may cause display of a visual information representation that precludes display of a "Parking Cents" destination similar as depicted in FIG. 5A.

As previously described, in some circumstances a program, an apparatus, and/or the like may cause display of visual information representations of one or more recommended destination locations in response to information indicative of a user desire to receive one more recommended destination locations. In some circumstances, a recommended destination location may correspond with a spatial avoidance location. For example, the user may have requested recommended destination locations corresponding with parking lots near a restaurant, and one or more parking lots near the restaurant may be a spatial avoidance location. In circumstances such as these, it may be desirable for a visual information representation of one or more recommended locations to comprise a spatial avoidance indicator.

The example of FIG. 5B illustrates visual information representation 520. Visual information representation information 520 may be representative of information received, generated, displayed, and/or the like from a program, such as an interactive mapping program, a navigation program, and/or the like. In the example of FIG. 5B, visual information representation 520 comprises a visual representation of a list of destinations comprising destinations 522, 524, 526, and 528. In the example of FIG. 5B, destinations 522, 524, 526, and 528 may be representative of recommended destination locations. For example, destinations 522, 524, 526, and 528 may be representative of parking lots near a destination address of a user of an interactive mapping program. In this manner, a user may view visual information representation 520 and determine that parking lots are located at locations corresponding with destinations 522, 524, 526, and 528. In the example of FIG. 5B, it can be seen that destination 526 has been rendered such that it is bracketed with asterisks. In this manner, the asterisks may be a spatial avoidance indicator. For example, one or more locations corresponding with the destination 526 may be spatial avoidance locations. A user may recognize that the asterisks bracketing destination 526 is a spatial avoidance indicator, and may avoid traveling to the location represented by destination 526. Even though the spatial avoidance indicator of destination 526 is illustrated as having a particular appearance, it should be understood that a spatial avoidance indicator may have any appearance.

As previously described, in some circumstances, display of visual information representations of one or more recommended destination locations may be precluded. The example of FIG. 5C illustrates visual information representation 540. Visual information representation information 540 may be representative of information received, generated, displayed, and/or the like from a program, such as an interactive mapping program, a navigation program, and/or the like. In the example of FIG. 5C, visual information representation 540 comprises visual representations of various roads, as well as visual indicators 542, 544, and 548. In the example of FIG. 5C, visual indicators 542, 544, and 548 may be representative of recommended destination locations. For example, visual indicators 542, 544, and 548 may be representative of parking lots near a destination address of a user of an interactive mapping program. In this manner, a user may view visual information representation 540 and determine that parking lots are located at locations corresponding with visual indicators 542, 544, and 548.

It can be seen that the example of FIG. 5C is similar in appearance to the example of FIG. 3B. For example, it can be seen that visual indicators 322, 324, and 328 of FIG. 3B may correspond with the same locations represented by visual indicators 542, 544, and 548 of FIG. 5B. It can be seen that the example of FIG. 5B fails to include a visual indicator corresponding with visual indicator 326 of FIG. 3B. In an example where the location represented by visual indicator 326 of FIG. 3B is a spatial avoidance location, a program, an apparatus, and/or the like may cause display of a visual information representation that precludes display of a visual information representation corresponding with the location represented by visual indicator 326 of FIG. 3B similar as depicted in FIG. 5B.

As previously described, in some circumstances, it may be desirable for a spatial avoidance indicator to comprise information indicative of a contact. For similar reasons, in some circumstances, it may be desirable for a visual indicator of a recommended destination location to comprise information indicative of a contact. For example, the recommended destination location may be a spatial avoidance location, and the user may wish to know what contact is associated with the spatial avoidance location.

Figure 5D:
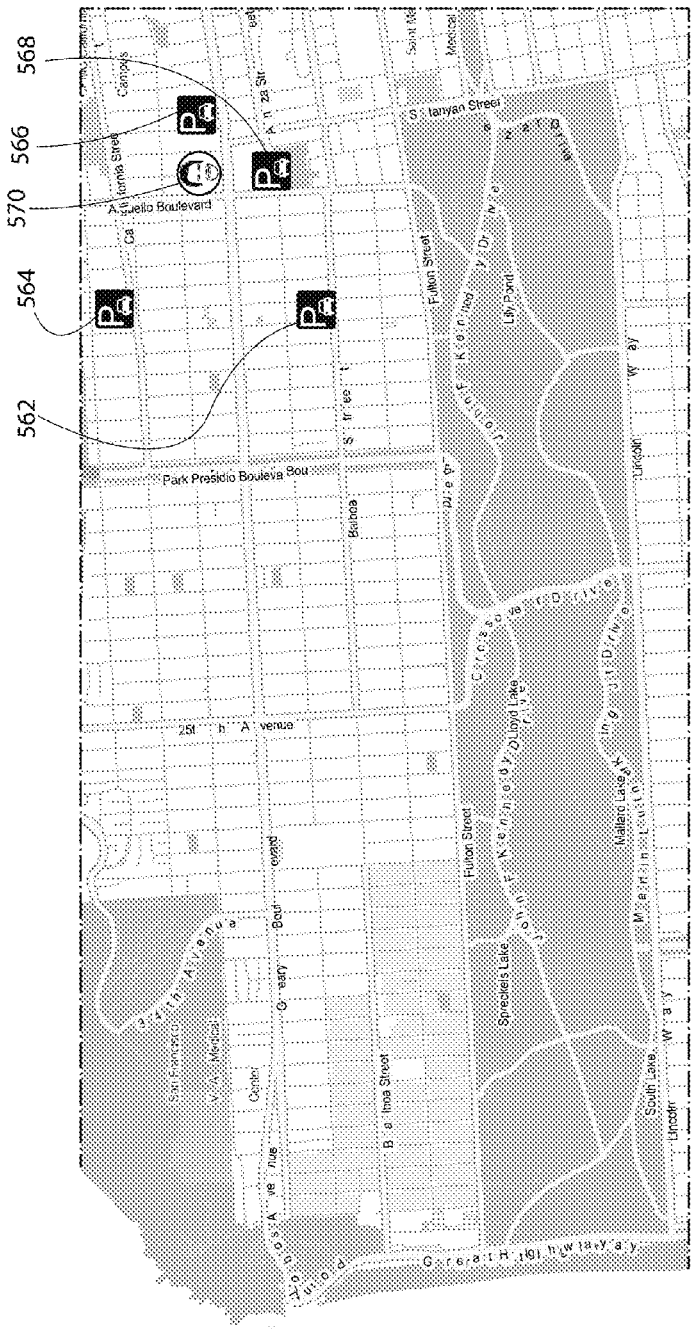

The example of FIG. 5D illustrates visual information representation 560. Visual information representation information 560 may be representative of information received, generated, displayed, and/or the like from a program, such as an interactive mapping program, a navigation program, and/or the like. In the example of FIG. 5D, visual information representation 560 comprises visual representations of various roads, as well as visual indicators 562, 564, 566, 568, and 570. In the example of FIG. 5D, visual indicators 562, 564, 566, and 568 may be representative of destination locations. For example, it can be seen that visual indicator 562 is rendered at a particular position in relation to the other visual representations and indicators of visual information representation 560. This manner, visual indicator 562 may be representative of a particular location, and a user may determine the location by viewing visual information representation 560. In the example of FIG. 5D, visual indicators 562, 564, 566, and 568 may be representative of recommended destination locations. For instance, an apparatus may have received information indicative of a user request for parking locations near a particular destination address. In response, the apparatus may have caused display of visual information representation 560, and visual indicators 562, 564, 566, and 568 may be representative of parking lots near a destination address of a user of an interactive mapping program. In this manner, a user may view visual information representation 560 and determine that parking lots are located at locations corresponding with visual indicators 562, 564, 566, and 568. In the example of FIG. 5D, visual indicator 570 is representative of a contact location of a contact. It can be seen that visual indicator 570 comprises an image of a face of a contact. In this manner, visual indicator 570 may comprise information indicative of the contact corresponding with the contact location represented by visual indicator 570. For example, the image may be an image of the contact. In circumstances where the location represents a spatial avoidance location, visual indicator 570 may be a spatial avoidance indicator. For example, a user may avoid traveling to the location represented by visual indicator 570 during circumstances where the user wishes to spatially avoid the contact represented by visual indicator 570. It can be seen that in the example of FIG. 5D, visual indicator 570 is near visual indicator 568. In this manner, visual indicators 570 and 568 may represent substantially similar locations. For example, visual indicator 570 may indicate that the contact associated with visual indicator 570 is currently located at the location represented by visual indicator 568. In this manner, visual indicators 570 and 568 may comprise a visual indicator of a recommended destination location comprising information indicative of a contact. Similarly, in this manner, visual indicators 570 and 568 may comprise a spatial avoidance indicator that comprises information indicative of a contact that has a contact location that corresponds with an intended user location.

Figure 6:
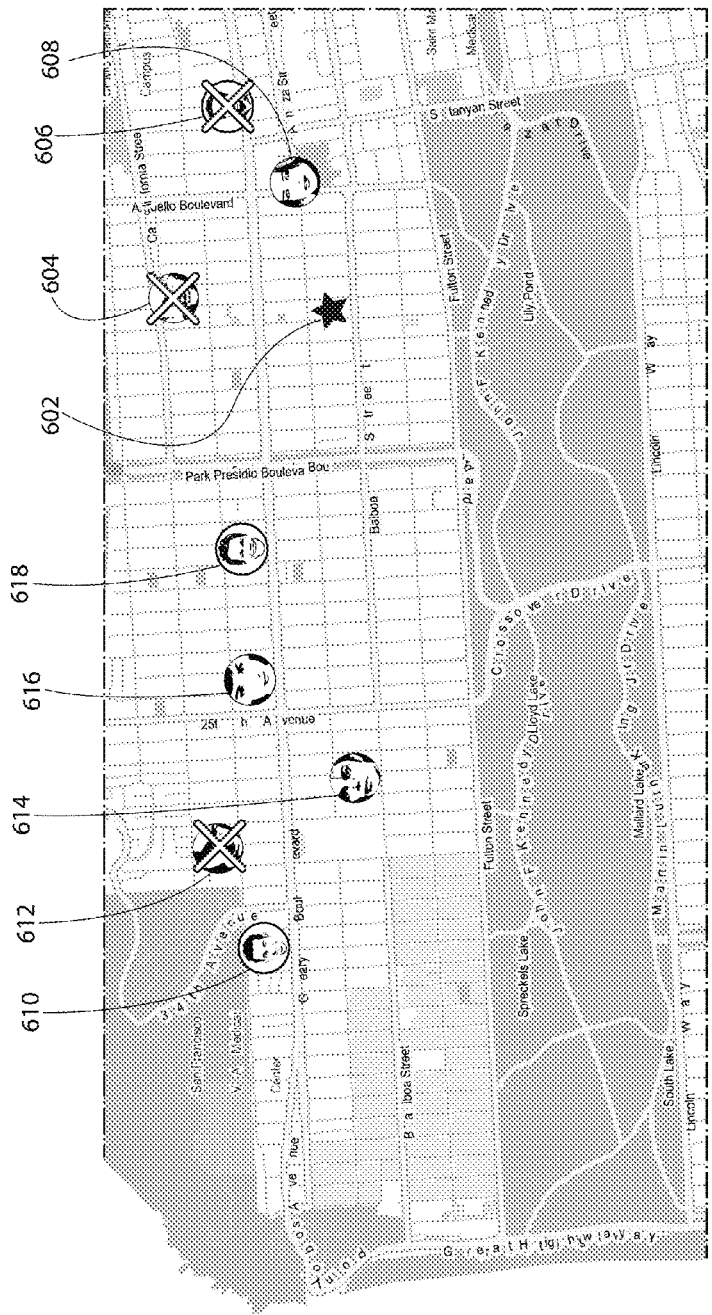
FIG. 6 is a diagram illustrating spatial avoidance contact indicators according to at least one example embodiment.

FIG. 6 is a diagram illustrating spatial avoidance contact indicators according to at least one example embodiment. The example of FIG. 6 is merely an example and does not limit the scope of the claims. For example, the type of spatial avoidance indicators may vary, the appearance of the spatial avoidance indicators may vary, the number of spatial avoidance indicators may vary, and/or the like.

In some circumstances, it may be desirable to display visual indicators representative of contact locations that fail to correspond with spatial avoidance locations simultaneously with visual indicators representative of contact locations correspond with spatial avoidance locations. For example, a user may wish to determine the location of all contacts from a contact list within a certain radius of the user's current position, while spatially avoiding contacts from a spatial avoidance contact list that is a subset of the contact list. For example, a user may wish to locate one or more contacts at a theater, while spatially avoiding other contacts at the theater. In circumstances such as these, it may be desirable to display a spatial avoidance contact indicator. A special avoidance contact indicator may refer to an indicator that identifies a spatial avoidance location of a spatial avoidance contact of a spatial avoidance contact list. For example, a spatial avoidance contact indicator may be rendered with a different appearance, with a different color, at a different size, and/or the like of other indicators such that the spatial avoidance contact indicator is recognized as a spatial avoidance contact indicator. In at least one example embodiment, a spatial avoidance contact indicator comprises information indicative of a spatial avoidance contact. For example, the spatial avoidance contact indicator may comprise a photograph of the spatial avoidance contact, list the spatial avoidance contacts name, and/or the like.

The example of FIG. 6 illustrates visual information representation 600. Visual information representation information 600 may be representative of information received, generated, displayed, and/or the like from a program, such as an interactive mapping program, a navigation program, and/or the like. In the example of FIG. 6, visual information representation 600 comprises visual representations of various roads, as well as visual indicators 602, 604, 606, 608, 610, 612, 614, 616, and 618. In the example of FIG. 6, visual indicator 6024 may be representative of a user's present location, a determined present location of the user, and/or the like. In the example of FIG. 6, visual indicators 604, 606, 608, 610, 612, 614, 616, and 618 are representative of a contact locations of a contacts. For example, contacts from a contact list may be associated with contact positions represented by visual indicators 604, 606, 608, 610, 612, 614, 616, and 618. It can be seen that I the example of FIG. 6, visual indicators 604, 608, and 612 are illustrated with an "X" superimposed over an image of persons face. In this manner, visual indicators 604, 608, and 612 differ from visual indicators 606, 610, 614, 616, and 618 such that visual indicators 604, 608, and 612 may be spatial avoidance contact indicators. In this manner, a user may view visual information representation 600 and determine that the locations represented by visual indicators 604, 608, and 612 are special avoidance locations, and the contacts associated with visual indicators 604, 608, and 612 are spatial avoidance contacts.

FIGS. 7A-7B are diagrams illustrating association of a contact with a location according to at least one example embodiment. The examples of FIGS. 7A-7B are merely examples and do not limit the scope of the claims. For example, the data structure may vary, the location of the data structure may vary, the information associated may vary, and/or the like.

As previously described, a set of spatial avoidance locations may be determined such that each spatial avoidance location of the set of spatial avoidance locations corresponds with a contact location of each contact of a spatial avoidance contact list. For example, an apparatus may access a data structure that correlates a contact with a contact location. The apparatus may determine that a contact within the data structure corresponds with a contact of a spatial avoidance contact list, and determine that the contact location associated with the contact is a spatial avoidance location.

FIG. 7A is a diagram showing contact and location association according to at least one example embodiment. The example of FIG. 7A illustrates an embodiment of a contact location data structure. The contact location data structure of FIG. 5A comprises information indicative of associations between contact 702 and location 712, between contact 704 and location 714, between contact 706 and location 716, and between contact 708 and location 718. For example, contact 702 may be a particular contact, and location 712 may be a current location of contact 702. As such, in the example of FIG. 7A, an association between contact 702 and location 712 has been established and stored in the contact location data structure. In the example of FIG. 7A, the data structure of FIG. 7A may be stored on a user controlled apparatus, on a social network service provider server, a location information service provider server, and/or the like. Even though the data structure of FIG. 7A is depicted as having a particular order, it should be understood that a contact location data structure may have any order, arrangement, and/or the like. Even though the data structure of FIG. 7A is illustrated as a table, it should be understood that a contact location data structure may comprise any format, such as a database entry, a linked list, an array, and/or the like.

In some circumstances, a user may wish to spatially avoid a contact at particular times. For example, a user may desire to spatially avoid a contact during business hours, but may not desire to specially avoid the contact outside of business hours. For example, the contact may be a friend that could distract the user from performing job related duties during business hours. In circumstances such as these, it may be desirable to determine a spatial avoidance schedule for a contact. A spatial avoidance schedule may be similar as described regarding FIGS. 8A-8C. In at least one example embodiment, spatial avoidance schedule is determined that indicates at least one time period for utilization of a spatial avoidance contact list. A time period of utilization may refer to a time period a user may wish to spatially avoid at least one spatial avoidance contact of a spatial avoidance contact list.

FIG. 7B is a diagram showing contact, location, and schedule association according to at least one example embodiment. The example of FIG. 7B illustrates an embodiment of a spatial avoidance schedule data structure. The spatial avoidance schedule data structure of FIG. 5C comprises information indicative of associations between contact 722, location 732, and schedule 742, between contact 724, location 734, and schedule 744, between contact 726, location 736, and schedule 746, and between contact 728, location 738, and schedule 748. For example, contact 722 may be a particular contact, location 732 may be a current location of contact 722, and schedule 742 may be a spatial avoidance schedule designated for contact 722. As such, an association between contact 722, location 732, and schedule 742 has been established and stored in the spatial avoidance schedule data structure of FIG. 7B. In the example of FIG. 7B, the data structure of FIG. 7B may be stored on a user controlled apparatus, on a social network service provider server, a location information service provider server, and/or the like. Even though the data structure of FIG. 7B is depicted as having a particular order, it should be understood that a spatial avoidance schedule data structure may have any order, arrangement, and/or the like. Even though the data structure of FIG. 7B is illustrated as a table, it should be understood that a spatial avoidance schedule data structure may comprise any format, such as a database entry, a linked list, an array, and/or the like.

In some circumstances, it may be known that a user intends to be at an intended location at a particular time. For example, a navigational routing program may estimate a user's arrival at a destination within a particular time frame. In at least one example embodiment, an intended user location time is determined. An intended user location time may refer to a time that is a time at which the user is intended to be at the intended user location.

In some circumstances, an intended location may be a spatial avoidance location at an intended user location time. For example, a spatial avoidance contact may be at the intended location, or may be anticipated to be at the intended location during the intended user location time. In circumstances such as these, it may be desirable to determine that the intended user location may be a spatial avoidance location at the intended user location time. In this manner, the user, a program, an apparatus, and/or the like may select a different intended user location. In at least one example embodiment, a program, an apparatus, and/or the like determines that an intended user location time is within the spatial avoidance schedule. In at least one example embodiment, determination that an intended user location corresponds with at least one spatial avoidance location of a set of spatial avoidance locations is based, at least in part, on the determination that the intended user location time is within the spatial avoidance schedule. In at least one example embodiment, a program, an apparatus, and/or the like determines that a current time is within a spatial avoidance schedule. In at least one example embodiment, determination that an intended user location corresponds with at least one spatial avoidance location of the set of spatial avoidance locations is based, at least in part, on the determination that the current time is within the spatial avoidance schedule.

Figures 8A, 8B, 8C:
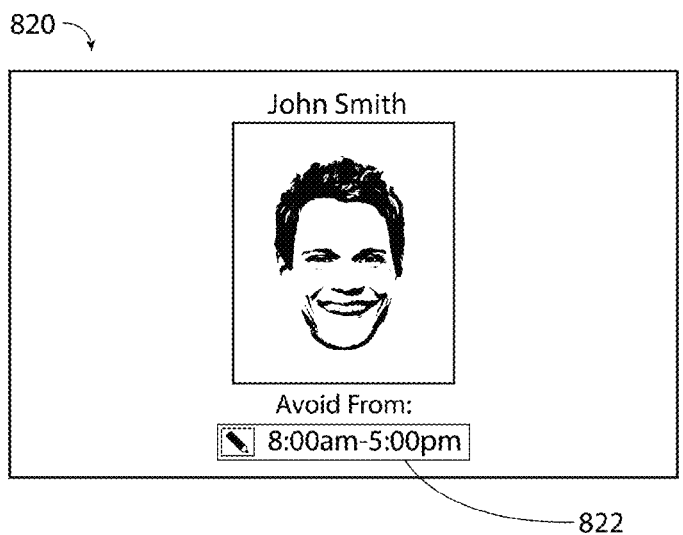
FIGS. 8A-8C are diagrams illustrating spatial avoidance schedules according to at least one example embodiment.

FIGS. 8A-8C are diagrams illustrating spatial avoidance schedules according to at least one example embodiment. The examples of FIGS. 8A-8C are merely examples and do not limit the scope of the claims. For example, the time periods of utilization may vary, the number of time periods of utilization may vary, the contacts may vary, and/or the like.

As previously described, in some circumstances, information indicative of a user input may be received from a user that designates a subset of contacts from a contact list as a spatial avoidance contact list. For example, a user may designate a subset of contacts from a social networking site, a telephone address book, and/or the like as spatial avoidance contacts. In this manner, the spatial avoidance contacts may comprise a spatial avoidance contact list. In at least one example embodiment, a contact list comprises at least one of a social media contact, a phone book contact, a transitive contact, and/or the like. A transitive contact may refer to a contact that a user may not be acquainted with, but who is acquainted with a contact the user is acquainted with (a "friend of a friend"). For example, transitive contacts may be identified from contact lists associated with a particular contact of a user contact list. In some circumstances, a user may wish to designate a transitive contact as a spatial avoidance contact. For example, a user may be concerned that a transitive contact may receive a pathogen from the user, and infect another contact the user is more familiar with.

The example of FIG. 8A illustrates a contact list 800. Contact list 800 comprises contacts 802, 804, 806, and 808. It can be seen in the example of FIG. 8A that contact 806 has been designated by a check in a tick box. For example, a user may have entered an input to designate contact 806 as a spatial avoidance contact. In this manner, a subset of contacts has been designated from contact list 800. In this manner, a spatial avoidance contact list may comprise contact 806. For example, an apparatus, a program, and/or the like may determine that the contact location of contact 806 is a spatial avoidance location, and that the contact locations of contacts 802, 804, and 808 do not require evaluation as spatial avoidance locations. In at least one example embodiment, determination of a set of spatial avoidance locations fails to evaluate any location of at least one contact of a contact list that is absent from the spatial avoidance contact list. For example, the current location, a future location, a determined location, a reported location, and/or the like of a contact that is absent from a spatial avoidance contact list may be failed to be evaluated. In at least one example embodiment, determination that an intended user location corresponds with at least one spatial avoidance location of a set of spatial avoidance locations fails to consider any location of at least one contact of a contact list that is absent from a spatial avoidance contact list.

As previously described, a spatial avoidance schedule may be determined that indicates at least one time period for utilization of a spatial avoidance contact list. For example, a spatial avoidance contact list may indicate a time period a user desires to spatially avoid a spatial avoidance contact on a spatial avoidance contact list.

The example of FIG. 8B illustrates a spatial avoidance schedule 810. Spatial avoidance schedule list 810 comprises spatial avoidance contacts 812, 814, 816, and 818. It can be seen that in the example of FIG. 8B, each of spatial avoidance contacts 812, 814, 816, and 818 each have a corresponding time period of utilization. For example, spatial avoidance contact 812 has a time period of utilization 8:00 am-5:00 pm. In this manner, a program, an apparatus, and/or the like may determine that the contact location of spatial avoidance contact 812 is a spatial avoidance location during the hours of 8:00 am-5:00 pm. In another example, spatial avoidance contact 818 has a corresponding time period of utilization of "do not avoid." In this manner, a program, an apparatus, and/or the like may determine that the contact location of spatial avoidance contact 818 may never be a spatial avoidance location.

In some circumstances, a user may desire to designate a spatial avoidance schedule. For example, a user's agenda for the day may change, and the user may wish to spatially avoid different contacts, may wish to spatially avoid particular contacts at times other than time previously designated, and/or the like. In circumstances such as these, it may be desirable for a program, an apparatus, and/or the like to receive a user input that designates the spatial avoidance schedule. For example, the user may enter a touch input, a voice input, and/or the like that designates a time period of utilization for a contact. I at least one example embodiment, information indicative of a user input that designates the spatial avoidance schedule is received.

The example of FIG. 8C illustrates visual representation of contact information 820. It can be seen that visual representation 820 comprises information corresponding with a contact, such as a name, a photograph, and a time period of utilization 822. A user may enter an input that designates a different time period for time period utilization 822. In this manner, the user input may designate a spatial avoidance schedule.

Figure 9:
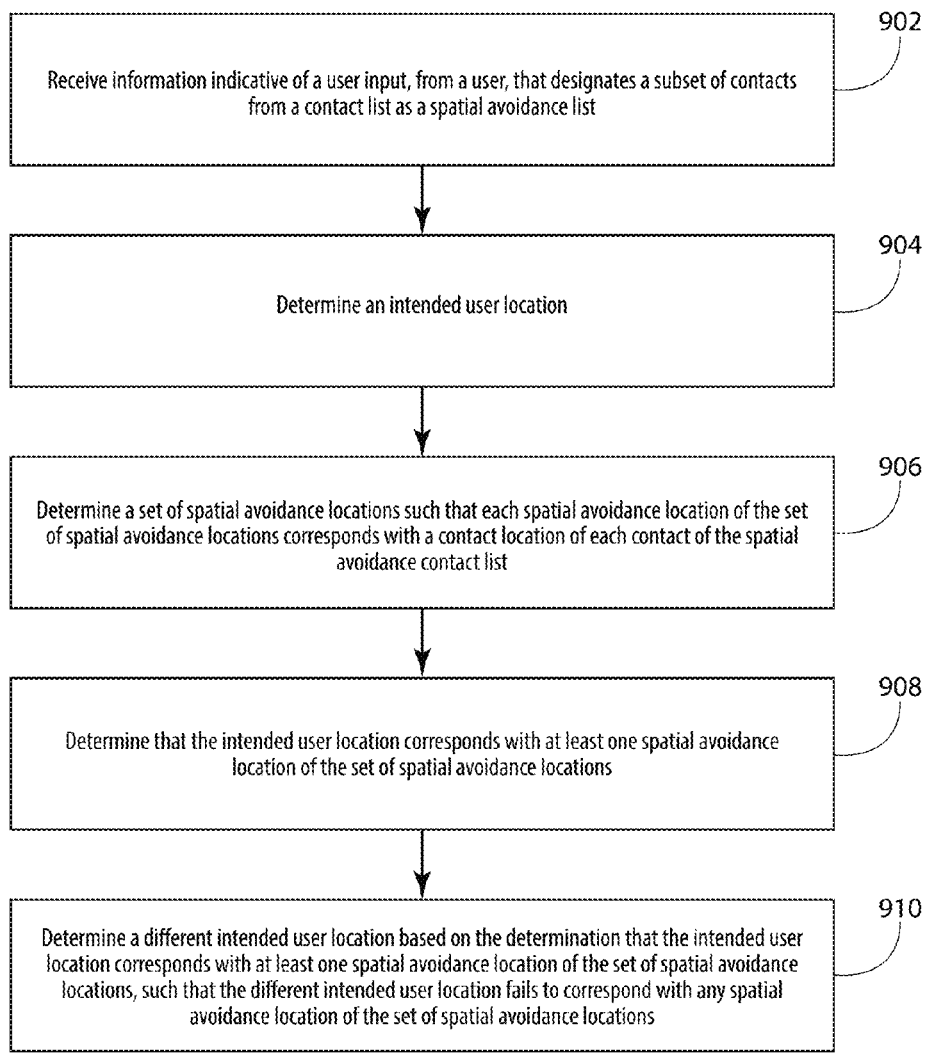
FIG. 9 is a flow diagram illustrating activities associated with determining a set of spatial avoidance locations according to at least one example embodiment.

FIG. 9 is a flow diagram illustrating activities associated with determining a set of spatial avoidance locations according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

As previously described, in some circumstances it may be desirable to determine a set of spatial avoidance locations.

At block 902, the apparatus receives information indicative of a user input, from a user, that designates a subset of contacts from a contact list as a spatial avoidance contact list. The receipt, the user, the user input, the designation, the contacts, the subset of contacts, the contact list, and the spatial avoidance contact list may be similar as described regarding FIG. 1, FIG. 2, FIGS. 3A-3B, FIGS. 4A-4B, FIGS. 5A-5D, FIG. 6, FIGS. 7A-7B, and FIGS. 8A-8C.

At block 904, the apparatus determines an intended user location. The determination and the intended user location may be similar as described regarding FIG. 2, FIGS. 3A-3B, FIGS. 4A-4B, FIGS. 5A-5D, FIG. 6, and FIGS. 7A-7B.

At block 906, the apparatus determines a set of spatial avoidance locations such that each spatial avoidance location of the set of spatial avoidance locations corresponds with a contact location of each contact of the spatial avoidance contact list. The determination, the spatial avoidance locations, the correspondence, and the contact locations may be similar as described regarding FIGS. 4A-4B, FIGS. 5A-5D, FIG. 6, FIGS. 7A-7B, and FIGS. 8A-8C.

At block 908, the apparatus determines that the intended user location corresponds with at least one spatial avoidance location of the set of spatial avoidance locations. The determination may be similar as described regarding FIGS. 4A-4B, FIGS. 5A-5D, FIG. 6, FIGS. 7A-7B, and FIGS. 8A-8C.

At block 910, the apparatus determines a different intended user location based, at least in part, on the determination that the intended user location corresponds with at least one spatial avoidance location of the set of spatial avoidance locations, such that the different intended user location fails to correspond with any spatial avoidance location of the set of spatial avoidance locations. The determination, the different intended user location, and the correspondence may be similar as described regarding FIG. 2, FIGS. 3A-3B, FIGS. 4A-4B, FIGS. 5A-5D, FIG. 6, FIGS. 7A-7B, and FIGS. 8A-8C.

Figure 10:
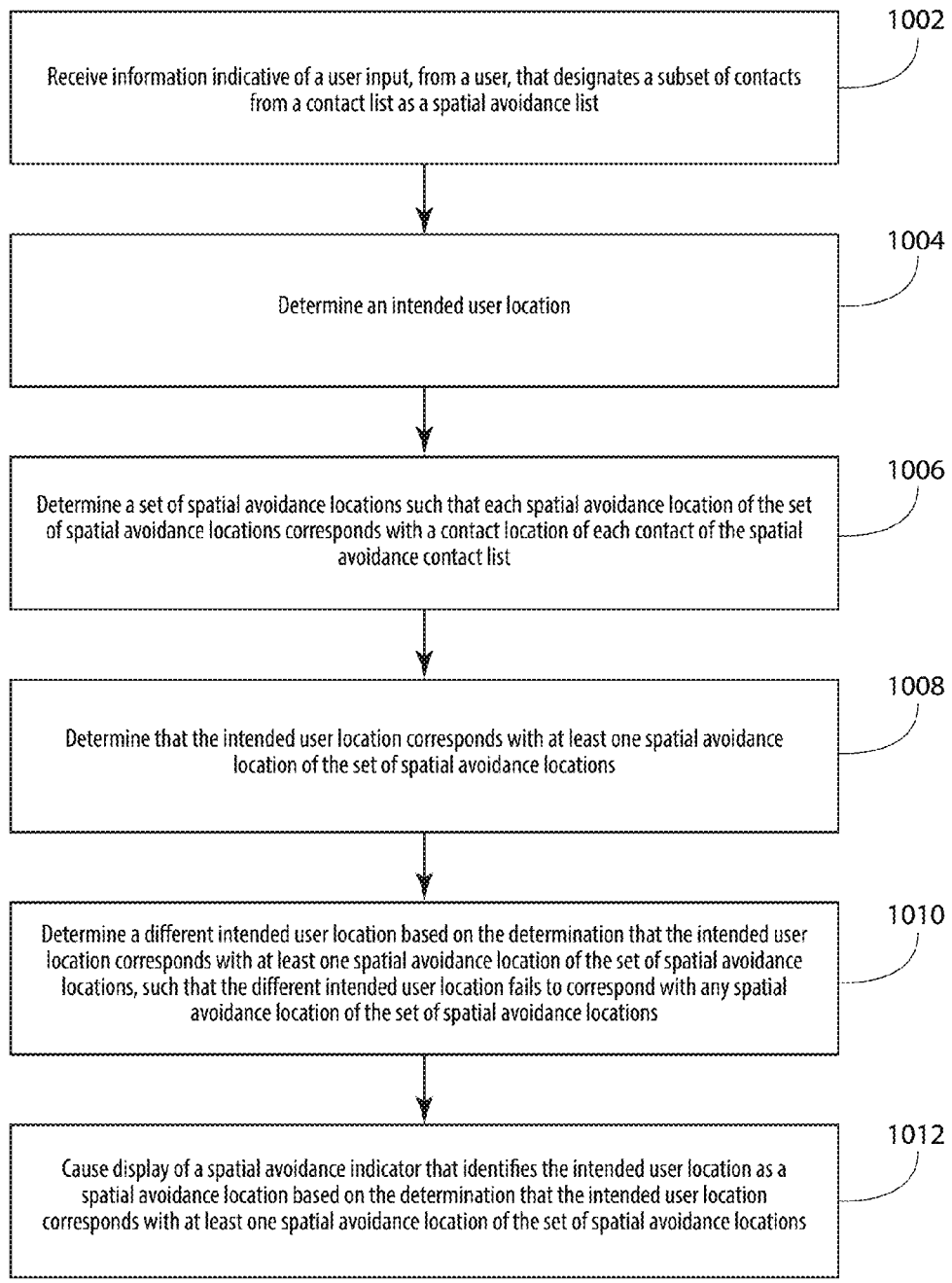
FIG. 10 is a flow diagram illustrating activities associated with display of a spatial avoidance indicator according to at least one example embodiment.

FIG. 10 is a flow diagram illustrating activities associated with display of a spatial avoidance indicator according to at least one example embodiment. In at least one example embodiment, there is a set of operations that corresponds with the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

As previously described, a spatial avoidance indicator may be displayed.

At block 1002, the apparatus receives information indicative of a user input, from a user, that designates a subset of contacts from a contact list as a spatial avoidance contact list, similarly as described regarding block 902 of FIG. 9. At block 1004, the apparatus determines an intended user location, similarly as described regarding block 904 of FIG. 9. At block 1006, the apparatus determines a set of spatial avoidance locations such that each spatial avoidance location of the set of spatial avoidance locations corresponds with a contact location of each contact of the spatial avoidance contact list, similarly as described regarding block 906 of FIG. 9. At block 1008, the apparatus determines that the intended user location corresponds with at least one spatial avoidance location of the set of spatial avoidance locations, similarly as described regarding block 908 of FIG. 9. At block 1010, the apparatus determines a different intended user location based, at least in part, on the determination that the intended user location corresponds with at least one spatial avoidance location of the set of spatial avoidance locations, such that the different intended user location fails to correspond with any spatial avoidance location of the set of spatial avoidance locations, similarly as described regarding block 910 of FIG. 9.

At block 1012, the apparatus causes display of a spatial avoidance indicator that identifies the intended user location as a spatial avoidance location based, at least in part, on the determination that the intended user location corresponds with at least one spatial avoidance location of the set of spatial avoidance locations. The display and the spatial avoidance indicator may be similar as described regarding FIGS. 4A-4B, FIGS. 5A-5D, and FIG. 6.

Figure 11:
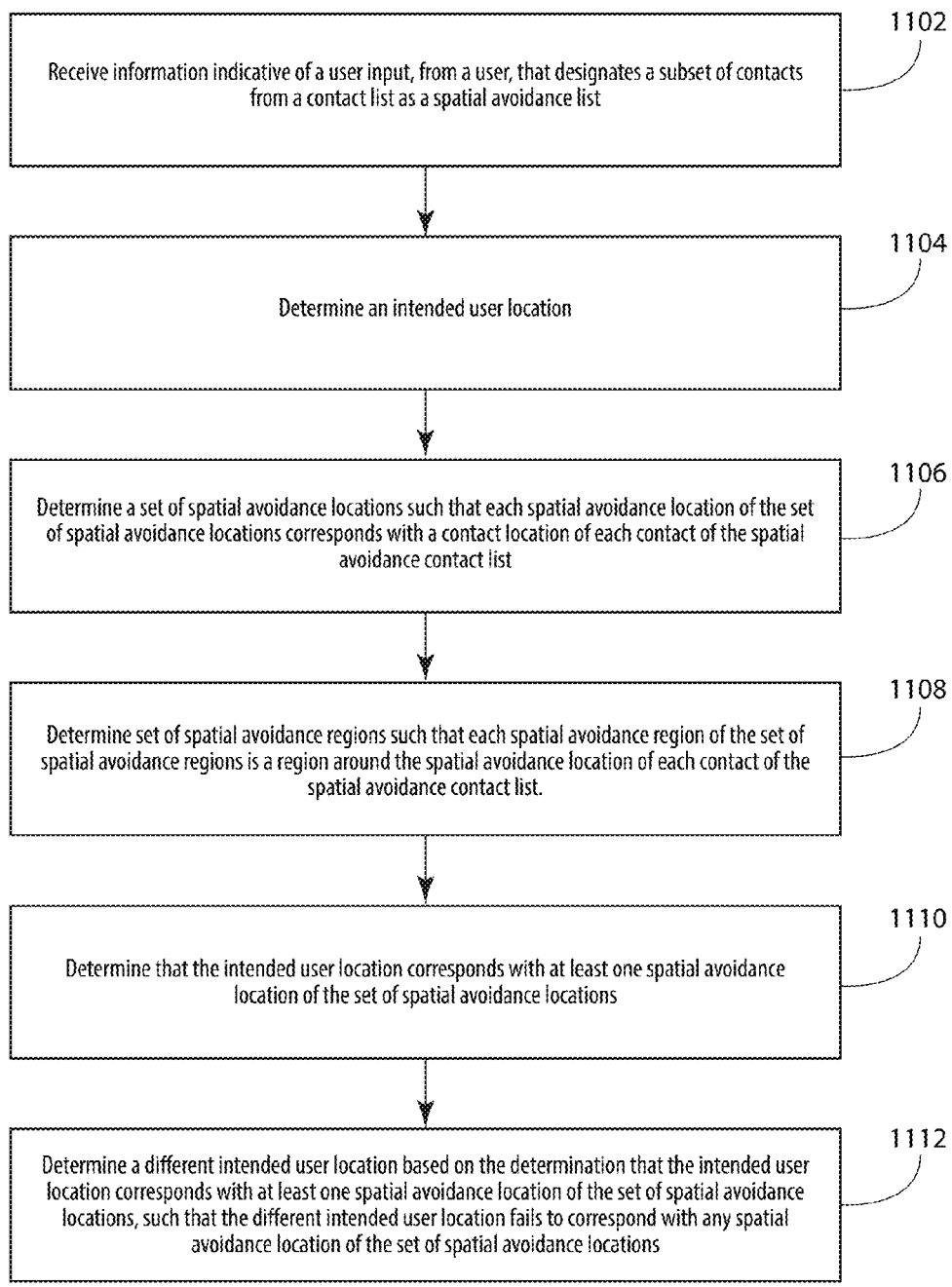
FIG. 11 is a flow diagram illustrating activities associated with determining a set of spatial avoidance regions according to at least one example embodiment.

FIG. 11 is a flow diagram illustrating activities associated with determining a set of spatial avoidance regions according to at least one example embodiment. In at least one example embodiment, there is a set of operations that corresponds with the activities of FIG. 11. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 11.

In some circumstances, a user may wish to avoid a region around a location. For example, the location may be a spatial avoidance location, and the region around the spatial avoidance location may inhibit the user from spatially avoiding a contact. For example, the location may be at large open area, and the user may be visible in the region surrounding the location. In circumstances such as these, it may be desirable to determine a spatial avoidance region for a spatial avoidance location. In this manner, an apparatus, a program, and/or the like may aid the user in avoiding travel to the spatial avoidance region.

For example, visual indicator 566 of FIG. 5D may be representative of a parking space in a parking lot. In such an example visual indicator 566 may also correspond with a spatial avoidance location. In circumstances such as these, the apparatus may determine that an entire parking lot comprising the parking space represented by visual indicator 566 is a spatial avoidance region based, at least in part, on the parking lot being an open area. In this manner, the apparatus may direct the user to avoid the parking lot such that the user is not seen by a contact associated with the spatial avoidance location corresponding with visual indicator 566.

A spatial avoidance region may be designated in various ways. For example, an avoidance distance may be designated around a spatial avoidance location, a spatial avoidance location may be bounded by an object, and/or the like. For example, visibility may be poor beyond a certain distance at a particular location, a particular location may have sight lines obscured by walls or building, and/or the like. In at least one example embodiment, the region around a spatial avoidance location is bounded by an avoidance distance. In at least one example embodiment, information indicative of a user input that designates the avoidance distance is received. In at least one example embodiment, the region around a spatial avoidance location is bounded by at least one object. In at least one example embodiment, the object is a structure represented in a geographic database. For example, a geographic database may include information related to the location of buildings, details of various structures (such as size, shape, etc.), and/or the like.

At block 1102, the apparatus receives information indicative of a user input, from a user, that designates a subset of contacts from a contact list as a spatial avoidance contact list, similarly as described regarding block 902 of FIG. 9. At block 1104, the apparatus determines an intended user location, similarly as described regarding block 904 of FIG. 9. At block 1106, the apparatus determines a set of spatial avoidance locations such that each spatial avoidance location of the set of spatial avoidance locations corresponds with a contact location of each contact of the spatial avoidance contact list, similarly as described regarding block 906 of FIG. 9.

At block 1108, the apparatus determines a set of spatial avoidance regions such that each spatial avoidance region of the set of spatial avoidance regions is a region around the spatial avoidance location of each contact of the spatial avoidance contact list.

At block 1110, the apparatus determines that the intended user location corresponds with at least one spatial avoidance location of the set of spatial avoidance locations, similarly as described regarding block 908 of FIG. 9. At block 1112, the apparatus determines a different intended user location based, at least in part, on the determination that the intended user location corresponds with at least one spatial avoidance location of the set of spatial avoidance locations, such that the different intended user location fails to correspond with any spatial avoidance location of the set of spatial avoidance locations, similarly as described regarding block 910 of FIG. 9.

Figure 12:
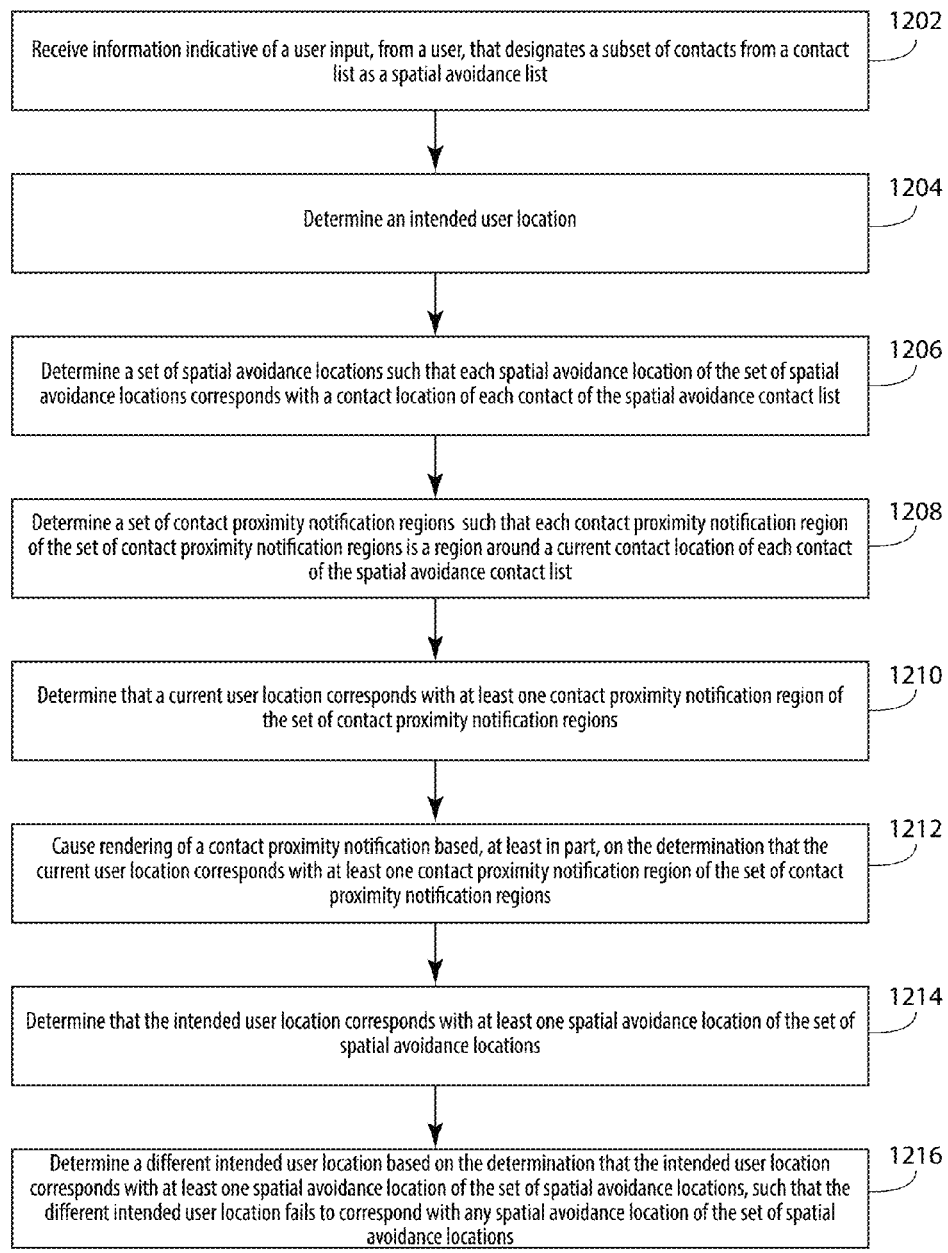
FIG. 12 is a flow diagram illustrating activities associated with determining a set of contact proximity regions according to at least one example embodiment.

FIG. 12 is a flow diagram illustrating activities associated with determining a set of contact proximity regions according to at least one example embodiment. In at least one example embodiment, there is a set of operations that corresponds with the activities of FIG. 12. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 12.

In some circumstances, a user may desire to be notified of proximity to a contact. For example, the contact may be a spatial avoidance contact that is traveling to a location near the user. In circumstances such as these, it may be desirable to cause rendering of a contact proximity notification. A contact proximity notification may refer to a notification that alerts a user that a contact is within a contact proximity notification region. A contact proximity notification region may refer to a distance around a spatial avoidance location in which a user desires to be notified with a proximity notification. For example, if a user desires to be notified when they are within 50 feet of a spatial avoidance location, the contact proximity region may be a circle with a 50 foot radius centered on the spatial avoidance location. In at least one example embodiment, a region around a spatial avoidance location is bounded by a contact proximity notification distance. In at least one example embodiment, a contact proximity notification comprises information indicative of a contact that has a contact proximity region that corresponds with the current user location In some circumstances, a user may desire to designate a contact proximity notification distance. For example, the user may desire to have a larger proximity notification distance in an open area, whereas the user may desire to have a smaller proximity notification distance in a crowded area. In at least one example embodiment, information indicative of a user input that designates the contact proximity notification distance is received.

For example, visual indicator 542 of FIG. 5C may be representative of a parking space in a parking lot. In circumstances such as these, the user may designate that a radius of the parking lot comprising the parking space represented by visual indicator 542 is a proximity notification distance. In this manner, the apparatus may notify the user if a spatial avoidance contact enters the parking lot.

At block 1202, the apparatus receives information indicative of a user input, from a user, that designates a subset of contacts from a contact list as a spatial avoidance contact list, similarly as described regarding block 902 of FIG. 9. At block 1204, the apparatus determines an intended user location, similarly as described regarding block 904 of FIG. 9. At block 1206, the apparatus determines a set of spatial avoidance locations such that each spatial avoidance location of the set of spatial avoidance locations corresponds with a contact location of each contact of the spatial avoidance contact list, similarly as described regarding block 906 of FIG. 9.

At block 1208, the apparatus determines a set of contact proximity notification regions such that each contact proximity notification region of the set of contact proximity notification regions is a region around a current contact location of each contact of the spatial avoidance contact list.

At block 1210, the apparatus determines that a current user location corresponds with at least one contact proximity notification region of the set of contact proximity notification regions.

At block 1212, the apparatus causes rendering of a contact proximity notification based, at least in part, on the determination that the current user location corresponds with at least one contact proximity notification region of the set of contact proximity notification regions.

At block 1214, the apparatus determines that the intended user location corresponds with at least one spatial avoidance location of the set of spatial avoidance locations, similarly as described regarding block 908 of FIG. 9. At block 1216, the apparatus determines a different intended user location based, at least in part, on the determination that the intended user location corresponds with at least one spatial avoidance location of the set of spatial avoidance locations, such that the different intended user location fails to correspond with any spatial avoidance location of the set of spatial avoidance locations, similarly as described regarding block 910 of FIG. 9.

Figure 13:
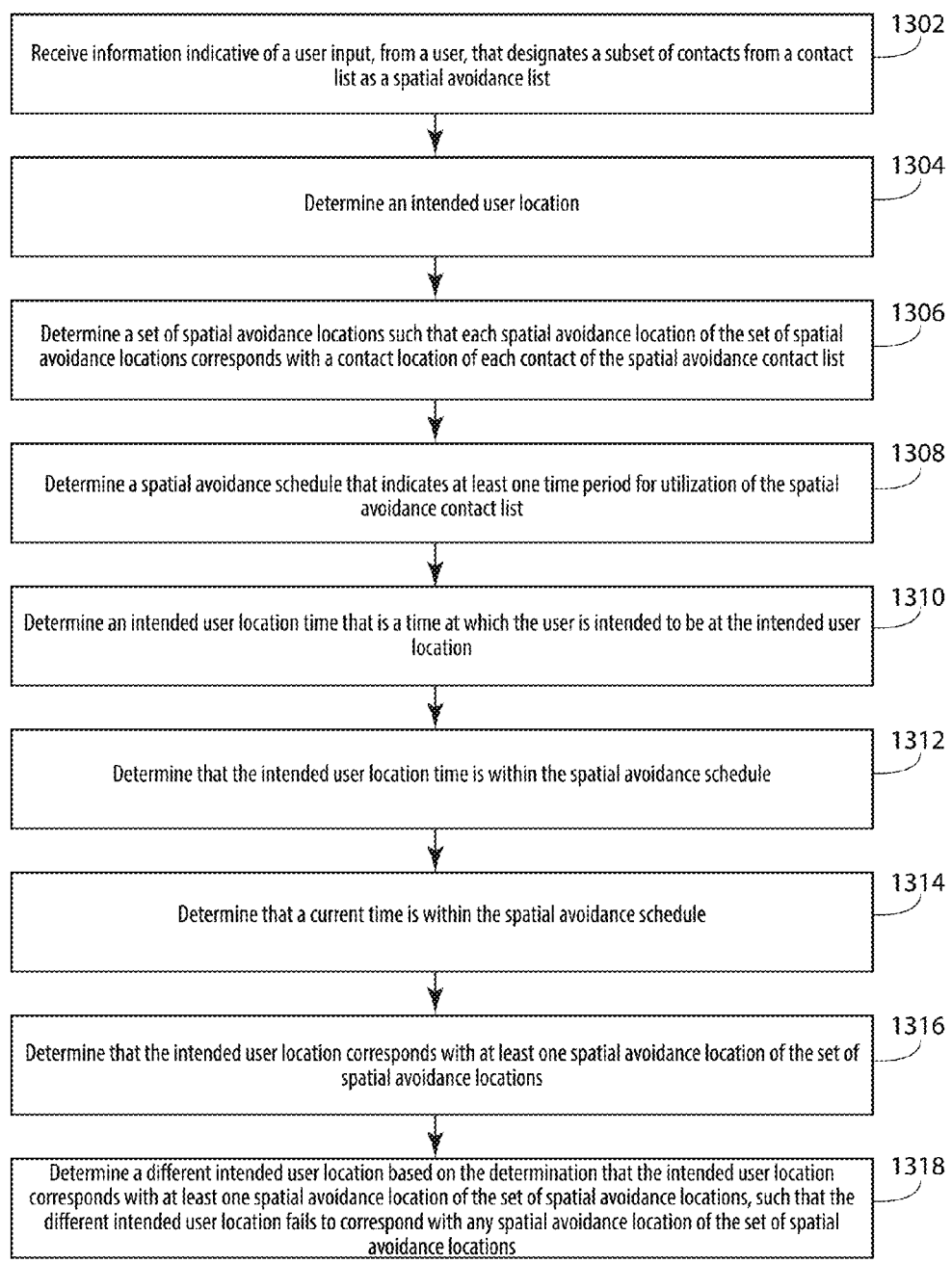
FIG. 13 is a flow diagram illustrating activities associated with determining a spatial avoidance schedule according to at least one example embodiment.

FIG. 13 is a flow diagram illustrating activities associated with determining a spatial avoidance schedule according to at least one example embodiment. In at least one example embodiment, there is a set of operations that corresponds with the activities of FIG. 13. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 13.

As previously described, a spatial avoidance schedule may be determined.

At block 1302, the apparatus receives information indicative of a user input, from a user, that designates a subset of contacts from a contact list as a spatial avoidance contact list, similarly as described regarding block 902 of FIG. 9. At block 1304, the apparatus determines an intended user location, similarly as described regarding block 904 of FIG. 9. At block 1306, the apparatus determines a set of spatial avoidance locations such that each spatial avoidance location of the set of spatial avoidance locations corresponds with a contact location of each contact of the spatial avoidance contact list, similarly as described regarding block 906 of FIG. 9.

At block 1308, the apparatus determines a spatial avoidance schedule that indicates at least one time period for utilization of the spatial avoidance contact list. The determination, the spatial avoidance schedule, and the time period of utilization may be similar as described regarding FIGS. 7A-7B and FIGS. 8A-8C.

At block 1310, the apparatus determines an intended user location time that is a time at which the user is intended to be at the intended user location. The determination, and the intended user location time may be similar as described regarding FIGS. 7A-7B.

At block 1312, the apparatus determines that the intended user location time is within the spatial avoidance schedule. In at least one example embodiment, the determination that the intended user location corresponds with at least one spatial avoidance location of the set of spatial avoidance locations is based, at least in part, on the determination that the intended user location time is within the spatial avoidance schedule. The determination may be similar as described regarding FIGS. 7A-7B and FIGS. 8A-8C.

At block 1314, the apparatus determines that a current time is within the spatial avoidance schedule. In at least one example embodiment, the determination that the intended user location corresponds with at least one spatial avoidance location of the set of spatial avoidance locations is based, at least in part, on the determination that the current time is within the spatial avoidance schedule. The determination and the current time may be similar as described regarding FIGS. 7A-7B and FIGS. 8A-8C.

At block 1316, the apparatus determines that the intended user location corresponds with at least one spatial avoidance location of the set of spatial avoidance locations, similarly as described regarding block 908 of FIG. 9. At block 1318, the apparatus determines a different intended user location based, at least in part, on the determination that the intended user location corresponds with at least one spatial avoidance location of the set of spatial avoidance locations, such that the different intended user location fails to correspond with any spatial avoidance location of the set of spatial avoidance locations, similarly as described regarding block 910 of FIG. 9.

Figure 14:
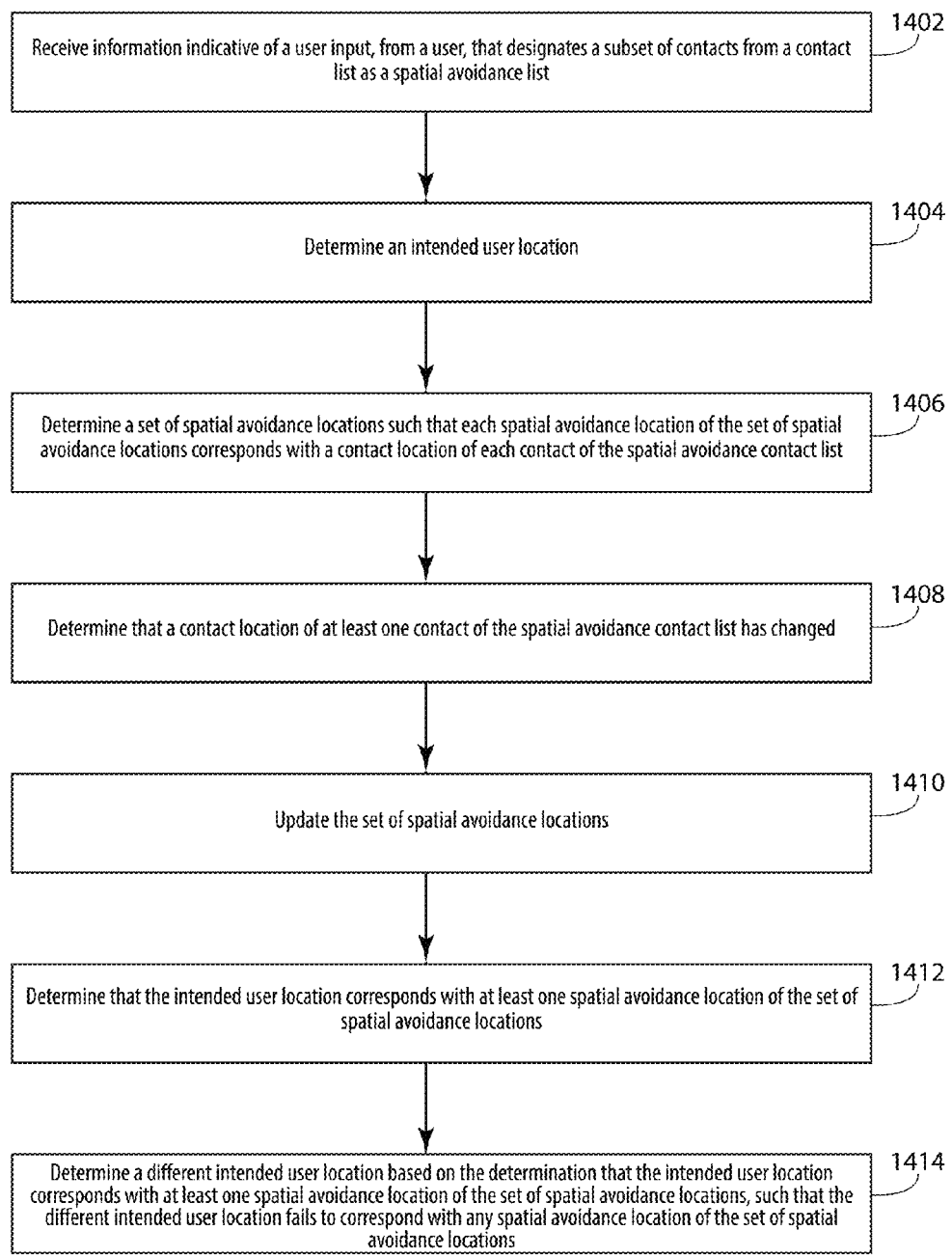
FIG. 14 is a flow diagram illustrating activities associated with determining a change of a contact location according to at least one example embodiment.

FIG. 14 is a flow diagram illustrating activities associated with determining a change of a contact location according to at least one example embodiment. In at least one example embodiment, there is a set of operations that corresponds with the activities of FIG. 14. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 14.

In some circumstances, the contact location of a contact may change. In circumstances where the contact is a contact of a spatial avoidance contact list, it may be desirable to update a set of spatial avoidance locations. For example, updating the spatial avoidance contact locations to reflect the contact location has changed may ensure that a user spatially avoids the contact. For example, a spatial avoidance indicator may be updated to reflect the changed contact location, and the user may avoid this location. In at least one example embodiment, an apparatus, a program, and/or the like determines that a contact location of at least one contact of a spatial avoidance contact list has changed. In at least one example embodiment, the set of spatial avoidance locations is updated based, at least in part, on the determination that the contact location of at least one contact of the spatial avoidance contact list has changed.

For example, a spatial avoidance contact may have been previously located in a parking lot represented by visual indicator 566 of FIG. 5D, and may change their location such that they are currently located in a parking lot represented by visual indicator 568 of FIG. 5D. An apparatus may determine that the contact location of the spatial avoidance contact has changed from the previous location to the current location, and the apparatus may update a set spatial avoidance locations to reflect the change of location.

At block 1402, the apparatus receives information indicative of a user input, from a user, that designates a subset of contacts from a contact list as a spatial avoidance contact list, similarly as described regarding block 902 of FIG. 9. At block 1404, the apparatus determines an intended user location, similarly as described regarding block 904 of FIG. 9. At block 1406, the apparatus determines a set of spatial avoidance locations such that each spatial avoidance location of the set of spatial avoidance locations corresponds with a contact location of each contact of the spatial avoidance contact list, similarly as described regarding block 906 of FIG. 9.

At block 1408, the apparatus determines that a contact location of at least one contact of the spatial avoidance contact list has changed.

At block 1410, the apparatus updates the set of spatial avoidance locations based, at least in part, on the determination that the contact location of at least one contact of the spatial avoidance contact list has changed.

At block 1412, the apparatus determines that the intended user location corresponds with at least one spatial avoidance location of the set of spatial avoidance locations, similarly as described regarding block 908 of FIG. 9. At block 1414, the apparatus determines a different intended user location based, at least in part, on the determination that the intended user location corresponds with at least one spatial avoidance location of the set of spatial avoidance locations, such that the different intended user location fails to correspond with any spatial avoidance location of the set of spatial avoidance locations, similarly as described regarding block 910 of FIG. 9.

One or more example embodiments may be implemented in software, hardware, application logic or a combination of software, hardware, and application logic. The software, application logic, and/or hardware may reside on the apparatus, a separate device, or a plurality of separate devices. If desired, part of the software, application logic, and/or hardware may reside on the apparatus, part of the software, application logic and/or hardware may reside on a separate device, and part of the software, application logic, and/or hardware may reside on a plurality of separate devices. In an example embodiment, the application logic, software or an instruction set is maintained on any one of various computer-readable media.

If desired, the different functions discussed herein may be performed in a different order and/or concurrently with each other. For example, block 902 of FIG. 9 may be performed after block 904 of FIG. 9. Furthermore, if desired, one or more of the above-described functions may be optional or may be combined. For example, block 902 of FIG. 9 may be optional and/or combined with block 904 of FIG. 9.

Although various aspects of the present subject matter are set out in the independent claims, other aspects of the present subject matter comprise other combinations of features from the described example embodiments and/or the dependent claims with the features of the independent claims, and not solely the combinations explicitly set out in the claims.

It is also noted herein that while the above describes example embodiments, these descriptions should not be viewed in a limiting sense. Rather, there are variations and modifications which may be made without departing from the scope of the present subject matter.

What is claimed is:

1. An apparatus, comprising:
    at least one processor;
    at least one memory including computer program code, the memory and the computer program code configured to, working with the processor, cause the apparatus to perform at least the following:
    identification of information that designates a subset of contacts from a contact list as a spatial avoidance contact list, wherein the subset of contacts is associated with a criteria of illness;
    determination of an intended user location;
    determination of a set of spatial avoidance locations such that each spatial avoidance location of the set of spatial avoidance locations corresponds with a contact location of each contact of the spatial avoidance contact list that are associated with the criteria of illness;
    determination that the intended user location corresponds with at least one spatial avoidance location of the set of spatial avoidance locations;
    determination of a different intended user location based, at least in part, on the determination that the intended user location corresponds with at least one spatial avoidance location of the set of spatial avoidance locations, such that the different intended user location fails to correspond with the at least one spatial avoidance location of the set of spatial avoidance locations;
    calculation of a route from a geographic database based on the different intended user location; and
    causation of display of a visual indicator for the route.

2. The apparatus of claim 1, wherein the memory includes computer program code configured to, working with the processor, cause the apparatus to perform causation of display of a spatial avoidance indicator that identifies the intended user location as a spatial avoidance location based, at least in part, on the determination that the intended user location corresponds with at least one spatial avoidance location of the set of spatial avoidance locations.

3. The apparatus of claim 2, wherein the spatial avoidance indicator comprises information indicative of a contact that has a contact location that corresponds with the intended user location.

4. The apparatus of claim 1, wherein the memory includes computer program code configured to, working with the processor, cause the apparatus to perform determination of a set of spatial avoidance regions such that each spatial avoidance region of the set of spatial avoidance regions is a region around the spatial avoidance location of each contact of the spatial avoidance contact list.

5. The apparatus of claim 1, wherein the memory includes computer program code configured to, working with the processor, cause the apparatus to perform:
    determination of a set of contact proximity notification regions such that each contact proximity notification region of the set of contact proximity notification regions is a region around a current contact location of each contact of the spatial avoidance contact list;
    determination that a current user location corresponds with at least one contact proximity notification region of the set of contact proximity notification regions; and
    causation of rendering of a contact proximity notification based, at least in part, on the determination that the current user location corresponds with at least one contact proximity notification region of the set of contact proximity notification regions.

6. The apparatus of claim 1, wherein the memory includes computer program code configured to, working with the processor, cause the apparatus to perform determination of a spatial avoidance schedule that indicates at least one time period for utilization of the spatial avoidance contact list.

7. The apparatus of claim 6, wherein the memory includes computer program code configured to, working with the processor, cause the apparatus to perform determination that a current time is within the spatial avoidance schedule, wherein the determination that the intended user location corresponds with at least one spatial avoidance location of the set of spatial avoidance locations is based, at least in part, on the determination that the current time is within the spatial avoidance schedule.

8. The apparatus of claim 1, wherein the memory includes computer program code configured to, working with the processor, cause the apparatus to perform:
    determination that a contact location of at least one contact of the spatial avoidance contact list has changed; and
    update of the set of spatial avoidance locations based, at least in part, on the determination that the contact location of at least one contact of the spatial avoidance contact list has changed.

9. The apparatus of claim 1, wherein the determination of the set of spatial avoidance locations fails to evaluate any location of at least one contact of the contact list that is absent from the spatial avoidance contact list.

10. A method comprising:
receiving information indicative of a user input, from a user, that designates a subset of contacts from a contact list as a spatial avoidance contact list;
determining an intended user location;
determining a set of spatial avoidance locations such that each spatial avoidance location of the set of spatial avoidance locations corresponds with a contact location of each contact of the spatial avoidance contact list;
determining a spatial avoidance schedule that indicates a first time period for utilization of the spatial avoidance contact list and avoidance of a first contact of the spatial avoidance contact list and a second time period for utilization of the spatial avoidance contact list and avoidance of a second contact of the spatial avoidance contact list;
determining that a current time is within the first time period or the second time period of the spatial avoidance schedule;
determining that the intended user location corresponds with at least one spatial avoidance location of the set of spatial avoidance locations during the first time period or the second time period;
determining a different intended user location based, at least in part, on the determination that the intended user location corresponds with at least one spatial avoidance location of the set of spatial avoidance locations, such that the different intended user location fails to correspond with any spatial avoidance location of the set of spatial avoidance locations;
calculating, using a geographic database, a route based on the different intended user location; and
providing a visual indicator for the route.

11. The method of claim 10, further comprising causing display of a spatial avoidance indicator that identifies the intended user location as a spatial avoidance location based, at least in part, on the determination that the intended user location corresponds with at least one spatial avoidance location of the set of spatial avoidance locations.

12. The method of claim 10, further comprising determining a set of spatial avoidance regions such that each spatial avoidance region of the set of spatial avoidance regions is a region around the spatial avoidance location of each contact of the spatial avoidance contact list.

13. The method of claim 10, further comprising:
determining a set of contact proximity notification regions such that each contact proximity notification region of the set of contact proximity notification regions is a region around a current contact location of each contact of the spatial avoidance contact list;
determining that a current user location corresponds with at least one contact proximity notification region of the set of contact proximity notification regions; and
causing rendering of a contact proximity notification based, at least in part, on the determination that the current user location corresponds with at least one contact proximity notification region of the set of contact proximity notification regions.

14. The method of claim 10, further comprising:
determining that a contact location of at least one contact of the spatial avoidance contact list has changed; and
updating the set of spatial avoidance locations based, at least in part, on the determination that the contact location of at least one contact of the spatial avoidance contact list has changed.

15. The method of claim 10, wherein the subset share one or more common criteria.

16. The method of claim 15, wherein the one or more common criteria includes a criminal conviction or an illness.

17. At least one non-transitory computer-readable medium encoded with instructions that, when executed by a processor, perform:
receipt of information indicative of a user input, from a user, that designates a subset of contacts from a contact list as a spatial avoidance contact list;
calculation, using a geographic database, of a first route to an intended user location;
determination a set of spatial avoidance locations such that each spatial avoidance location of the set of spatial avoidance locations corresponds with a contact location of each contact of the spatial avoidance contact list;
determination that the first route associated with the intended user location corresponds with at least one spatial avoidance location of the set of spatial avoidance locations;
calculation, using the geographic database, of a second route associated with a different intended user location based, at least in part, on the determination that the intended user location corresponds with at least one spatial avoidance location of the set of spatial avoidance locations, such that the different intended user location fails to correspond with any spatial avoidance location of the set of spatial avoidance locations; and
causation of display of a first visual indicator for the first route and a second visual indicator for the second route.

18. The medium of claim 17, further encoded with instructions that, when executed by a processor, perform causation of display of a spatial avoidance indicator that identifies the intended user location as a spatial avoidance location based, at least in part, on the determination that the intended user location corresponds with at least one spatial avoidance location of the set of spatial avoidance locations.

19. The medium of claim 17, further encoded with instructions that, when executed by a processor, perform determination of a set of spatial avoidance regions such that each spatial avoidance region of the set of spatial avoidance regions is a region around the spatial avoidance location of each contact of the spatial avoidance contact list.

20. The medium of claim 17, further encoded with instructions that, when executed by a processor, perform:
determination of a set of contact proximity notification regions such that each contact proximity notification region of the set of contact proximity notification regions is a region around a current contact location of each contact of the spatial avoidance contact list;
determination that a current user location corresponds with at least one contact proximity notification region of the set of contact proximity notification regions; and
causation of rendering of a contact proximity notification based, at least in part, on the determination that the current user location corresponds with at least one contact proximity notification region of the set of contact proximity notification regions.

* * * * *